United States Patent
Fazel et al.

(10) Patent No.: US 7,551,346 B2
(45) Date of Patent: Jun. 23, 2009

(54) ELECTRO-OPTIC DISPLAYS, AND MATERIALS FOR USE THEREIN

(75) Inventors: Shafiq N. Fazel, Allentown, PA (US); Guy M. Danner, Somerville, MA (US); Lan Cao, Arlington, MA (US); David D. Miller, Wakefield, MA (US); Eric H. Klingenberg, Emmaus, PA (US)

(73) Assignees: E Ink Corporation, Cambridge, MA (US); Air Products and Chemicals, Inc., Allentown, PA (US)

( * ) Notice: Subject to any disclaimer, the term of this patent is extended or adjusted under 35 U.S.C. 154(b) by 9 days.

(21) Appl. No.: 11/768,395

(22) Filed: Jun. 26, 2007

(65) Prior Publication Data

US 2007/0286975 A1    Dec. 13, 2007

Related U.S. Application Data

(60) Continuation-in-part of application No. 11/613,259, filed on Dec. 20, 2006, now Pat. No. 7,349,148, which is a division of application No. 10/904,351, filed on Nov. 5, 2004, now Pat. No. 7,173,752.

(60) Provisional application No. 60/481,787, filed on Dec. 14, 2003, provisional application No. 60/481,605, filed on Nov. 6, 2003, provisional application No. 60/481,600, filed on Nov. 5, 2003.

(51) Int. Cl.
  *G02F 1/00* (2006.01)
  *G02F 1/03* (2006.01)
  *B32B 7/12* (2006.01)
  *B32B 15/04* (2006.01)

(52) U.S. Cl. .................. 359/321; 359/245; 359/254; 428/343; 428/355 AC

(58) Field of Classification Search .................. 359/245, 359/254, 265, 296, 321; 428/343, 355 AC, 428/355 EP
See application file for complete search history.

(56) References Cited

U.S. PATENT DOCUMENTS 3,668,106 A    6/1972   Ota (Continued)

FOREIGN PATENT DOCUMENTS

EP    1 099 207 B1    3/2002

(Continued)

OTHER PUBLICATIONS

Amundson, K., "Electrophoretic Imaging Films for Electronic Paper Displays" in Crawford, G. ed. Flexible Flat Panal Displays, John Wiley & Sons, Ltd., Hoboken, NJ: 2005.

(Continued)

*Primary Examiner*—David N Spector
(74) *Attorney, Agent, or Firm*—David J. Cole

(57) ABSTRACT

An electro-optic display comprises a layer of solid electro-optic material; a backplane comprising at least one electrode; and an adhesive layer disposed between the layer of electro-optic material and the backplane and adhesively securing the layer of electro-optic material to the backplane, the adhesive layer comprising a thermally-activated cross-linking agent comprising an epoxidized vegetable oil fatty acid or an epoxidized ester of such a fatty acid. The cross-linking agent reduces void growth when the display is subjected to temperature changes.

31 Claims, 6 Drawing Sheets

U.S. PATENT DOCUMENTS

| | | | |
|---|---|---|---|
| 3,741,935 A * | 6/1973 | Dowbenko | 528/227 |
| 3,756,693 A | 9/1973 | Ota | |
| 3,767,392 A | 10/1973 | Ota | |
| 3,792,308 A | 2/1974 | Ota | |
| 3,870,517 A | 3/1975 | Ota et al. | |
| 3,892,568 A | 7/1975 | Ota | |
| 3,956,224 A * | 5/1976 | Chu | 525/374 |
| 4,383,060 A | 5/1983 | Dearlove et al. | |
| 4,418,346 A | 11/1983 | Batchelder | |
| 4,829,142 A * | 5/1989 | Gonzalez et al. | 528/111 |
| 5,621,043 A | 4/1997 | Croft | |
| 5,745,094 A | 4/1998 | Gordon, II et al. | |
| 5,760,761 A | 6/1998 | Sheridon | |
| 5,777,782 A | 7/1998 | Sheridon | |
| 5,808,783 A | 9/1998 | Crowley | |
| 5,872,552 A | 2/1999 | Gordon, II et al. | |
| 5,930,026 A | 7/1999 | Jacobson et al. | |
| 5,961,804 A | 10/1999 | Jacobson et al. | |
| 6,017,584 A | 1/2000 | Albert et al. | |
| 6,054,071 A | 4/2000 | Mikkelsen, Jr. | |
| 6,055,091 A | 4/2000 | Sheridon et al. | |
| 6,067,185 A | 5/2000 | Albert et al. | |
| 6,097,531 A | 8/2000 | Sheridon | |
| 6,118,426 A | 9/2000 | Albert et al. | |
| 6,120,588 A | 9/2000 | Jacobson | |
| 6,120,839 A | 9/2000 | Comiskey et al. | |
| 6,124,851 A | 9/2000 | Jacobson | |
| 6,128,124 A | 10/2000 | Silverman | |
| 6,130,773 A | 10/2000 | Jacobson et al. | |
| 6,130,774 A | 10/2000 | Albert et al. | |
| 6,137,467 A | 10/2000 | Sheridon et al. | |
| 6,144,361 A | 11/2000 | Gordon, II et al. | |
| 6,147,791 A | 11/2000 | Sheridon | |
| 6,172,798 B1 | 1/2001 | Albert et al. | |
| 6,177,921 B1 | 1/2001 | Comiskey et al. | |
| 6,184,856 B1 | 2/2001 | Gordon, II et al. | |
| 6,225,971 B1 | 5/2001 | Gordon, II et al. | |
| 6,232,950 B1 | 5/2001 | Albert et al. | |
| 6,241,921 B1 | 6/2001 | Jacobson et al. | |
| 6,249,271 B1 | 6/2001 | Albert et al. | |
| 6,252,564 B1 | 6/2001 | Albert et al. | |
| 6,262,706 B1 | 7/2001 | Albert et al. | |
| 6,262,833 B1 | 7/2001 | Loxley et al. | |
| 6,271,823 B1 | 8/2001 | Gordon, II et al. | |
| 6,300,932 B1 | 10/2001 | Albert | |
| 6,301,038 B1 | 10/2001 | Fitzmaurice et al. | |
| 6,312,304 B1 | 11/2001 | Duthaler et al. | |
| 6,312,971 B1 | 11/2001 | Amundson et al. | |
| 6,323,989 B1 | 11/2001 | Jacobson et al. | |
| 6,327,072 B1 | 12/2001 | Comiskey et al. | |
| 6,376,828 B1 | 4/2002 | Comiskey | |
| 6,377,387 B1 | 4/2002 | Duthaler et al. | |
| 6,392,785 B1 | 5/2002 | Albert et al. | |
| 6,392,786 B1 | 5/2002 | Albert | |
| 6,413,790 B1 | 7/2002 | Duthaler et al. | |
| 6,422,687 B1 | 7/2002 | Jacobson | |
| 6,445,374 B2 | 9/2002 | Albert et al. | |
| 6,445,489 B1 | 9/2002 | Jacobson et al. | |
| 6,459,418 B1 | 10/2002 | Comiskey et al. | |
| 6,473,072 B1 | 10/2002 | Comiskey et al. | |
| 6,480,182 B2 | 11/2002 | Turner et al. | |
| 6,498,114 B1 | 12/2002 | Amundson et al. | |
| 6,504,524 B1 | 1/2003 | Gates et al. | |
| 6,506,438 B2 | 1/2003 | Duthaler et al. | |
| 6,512,354 B2 | 1/2003 | Jacobson et al. | |
| 6,515,649 B1 | 2/2003 | Albert et al. | |
| 6,518,949 B2 | 2/2003 | Drzaic | |
| 6,521,489 B2 | 2/2003 | Duthaler et al. | |
| 6,531,997 B1 | 3/2003 | Gates et al. | |
| 6,535,197 B1 | 3/2003 | Comiskey et al. | |
| 6,538,801 B2 | 3/2003 | Jacobson et al. | |
| 6,545,291 B1 | 4/2003 | Amundson et al. | |
| 6,580,545 B2 | 6/2003 | Morrison et al. | |
| 6,639,578 B1 | 10/2003 | Comiskey et al. | |
| 6,652,075 B2 | 11/2003 | Jacobson | |
| 6,657,772 B2 | 12/2003 | Loxley | |
| 6,664,944 B1 | 12/2003 | Albert et al. | |
| D485,294 S | 1/2004 | Albert | |
| 6,672,921 B1 | 1/2004 | Liang et al. | |
| 6,680,725 B1 | 1/2004 | Jacobson | |
| 6,683,333 B2 | 1/2004 | Kazlas et al. | |
| 6,693,620 B1 | 2/2004 | Herb et al. | |
| 6,704,133 B2 | 3/2004 | Gates et al. | |
| 6,710,540 B1 | 3/2004 | Albert et al. | |
| 6,721,083 B2 | 4/2004 | Jacobson et al. | |
| 6,724,519 B1 | 4/2004 | Comiskey et al. | |
| 6,727,881 B1 | 4/2004 | Albert et al. | |
| 6,738,050 B2 | 5/2004 | Comiskey et al. | |
| 6,750,473 B2 | 6/2004 | Amundson et al. | |
| 6,753,999 B2 | 6/2004 | Zehner et al. | |
| 6,788,449 B2 | 9/2004 | Liang et al. | |
| 6,816,147 B2 | 11/2004 | Albert | |
| 6,819,471 B2 | 11/2004 | Amundson et al. | |
| 6,822,782 B2 | 11/2004 | Honeyman et al. | |
| 6,825,068 B2 | 11/2004 | Denis et al. | |
| 6,825,829 B1 | 11/2004 | Albert et al. | |
| 6,825,970 B2 | 11/2004 | Goenaga et al. | |
| 6,831,769 B2 | 12/2004 | Holman et al. | |
| 6,839,158 B2 | 1/2005 | Albert et al. | |
| 6,842,167 B2 | 1/2005 | Albert et al. | |
| 6,842,279 B2 | 1/2005 | Amundson | |
| 6,842,657 B1 | 1/2005 | Drzaic et al. | |
| 6,864,875 B2 | 3/2005 | Drzaic et a. | |
| 6,865,010 B2 | 3/2005 | Duthaler et al. | |
| 6,866,760 B2 | 3/2005 | Paolini Jr. et al. | |
| 6,870,657 B1 | 3/2005 | Fitzmaurice et al. | |
| 6,870,661 B2 | 3/2005 | Pullen et al. | |
| 6,900,851 B2 | 5/2005 | Morrison et al. | |
| 6,922,276 B2 | 7/2005 | Zhang et al. | |
| 6,950,220 B2 | 9/2005 | Abramson et al. | |
| 6,958,848 B2 | 10/2005 | Cao et al. | |
| 6,967,640 B2 | 11/2005 | Albert et al. | |
| 6,980,196 B1 | 12/2005 | Turner et al. | |
| 6,982,178 B2 | 1/2006 | LeCain et al. | |
| 6,987,603 B2 | 1/2006 | Paolini, Jr. et al. | |
| 6,995,550 B2 | 2/2006 | Jacobson et al. | |
| 7,002,728 B2 | 2/2006 | Pullen et al. | |
| 7,012,600 B2 | 3/2006 | Zehner et al. | |
| 7,012,735 B2 | 3/2006 | Honeyman et al. | |
| 7,023,420 B2 | 4/2006 | Comiskey et al. | |
| 7,030,412 B1 | 4/2006 | Drzaic et al. | |
| 7,030,854 B2 | 4/2006 | Baucom et al. | |
| 7,034,783 B2 | 4/2006 | Gates et al. | |
| 7,038,655 B2 | 5/2006 | Herb et al. | |
| 7,061,663 B2 | 6/2006 | Cao et al. | |
| 7,071,913 B2 | 7/2006 | Albert et al. | |
| 7,075,502 B1 | 7/2006 | Drzaic et al. | |
| 7,075,703 B2 | 7/2006 | O'Neil et al. | |
| 7,079,305 B2 | 7/2006 | Paolini, Jr. et al. | |
| 7,106,296 B1 | 9/2006 | Jacobson | |
| 7,109,968 B2 | 9/2006 | Albert et al. | |
| 7,110,163 B2 | 9/2006 | Webber et al. | |
| 7,110,164 B2 | 9/2006 | Paolini, Jr. et al. | |
| 7,116,318 B2 | 10/2006 | Amundson et al. | |
| 7,116,466 B2 | 10/2006 | Whitesides et al. | |
| 7,119,759 B2 | 10/2006 | Zehner et al. | |
| 7,119,772 B2 | 10/2006 | Amundson et al. | |
| 7,148,128 B2 | 12/2006 | Jacobson | |
| 7,167,155 B1 | 1/2007 | Albert et al. | |
| 7,170,670 B2 | 1/2007 | Webber | |
| 7,173,752 B2 * | 2/2007 | Doshi et al. | 359/296 |
| 7,176,880 B2 | 2/2007 | Amundson et al. | |
| 7,180,649 B2 | 2/2007 | Morrison et al. | |
| 7,190,008 B2 | 3/2007 | Amundson et al. | |

| | | |
|---|---|---|
| 7,193,625 B2 | 3/2007 | Danner et al. |
| 7,202,847 B2 | 4/2007 | Gates |
| 7,202,991 B2 | 4/2007 | Zhang et al. |
| 7,206,119 B2 | 4/2007 | Honeyman et al. |
| 7,223,672 B2 | 5/2007 | Kazlas et al. |
| 7,230,750 B2 | 6/2007 | Whitesides et al. |
| 7,230,751 B2 | 6/2007 | Whitesides et al. |
| 7,236,290 B1 | 6/2007 | Zhang et al. |
| 7,236,291 B2 | 6/2007 | Kaga et al. |
| 7,236,292 B2 | 6/2007 | LeCain et al. |
| 7,242,513 B2 | 7/2007 | Albert et al. |
| 7,247,379 B2 | 7/2007 | Pullen et al. |
| 7,256,766 B2 | 8/2007 | Albert et al. |
| 7,259,744 B2 | 8/2007 | Arango et al. |
| 7,280,094 B2 | 10/2007 | Albert |
| 7,304,634 B2 | 12/2007 | Albert et al. |
| 7,304,787 B2 | 12/2007 | Whitesides et al. |
| 7,312,784 B2 | 12/2007 | Baucom et al. |
| 7,312,794 B2 | 12/2007 | Zehner et al. |
| 7,312,916 B2 | 12/2007 | Pullen et al. |
| 7,321,459 B2 | 1/2008 | Masuda et al. |
| 7,327,511 B2 | 2/2008 | Whitesides et al. |
| 7,339,715 B2 | 3/2008 | Webber et al. |
| 7,349,148 B2 * | 3/2008 | Doshi et al. ................. 359/296 |
| 7,352,353 B2 | 4/2008 | Albert et al. |
| 7,365,394 B2 | 4/2008 | Denis et al. |
| 7,365,733 B2 | 4/2008 | Duthaler et al. |
| 7,375,875 B2 | 5/2008 | Whitesides et al. |
| 7,382,363 B2 | 6/2008 | Albert et al. |
| 7,388,572 B2 | 6/2008 | Duthaler et al. |
| 7,391,555 B2 | 6/2008 | Albert et al. |
| 7,411,719 B2 | 8/2008 | Paolini, Jr. et al. |
| 7,411,720 B2 | 8/2008 | Honeyman et al. |
| 7,420,549 B2 | 9/2008 | Jacobson et al. |
| 7,442,587 B2 | 10/2008 | Amundson et al. |
| 7,443,571 B2 | 10/2008 | LeCain et al. |
| 7,453,445 B2 | 11/2008 | Amundson |
| 2002/0060321 A1 | 5/2002 | Kazlas et al. |
| 2002/0090980 A1 | 7/2002 | Wilcox et al. |
| 2003/0102858 A1 | 6/2003 | Jacobson et al. |
| 2004/0105036 A1 | 6/2004 | Danner et al. |
| 2004/0112750 A1 | 6/2004 | Jacobson et al. |
| 2004/0119681 A1 | 6/2004 | Albert et al. |
| 2004/0155857 A1 | 8/2004 | Duthaler et al. |
| 2004/0180476 A1 | 9/2004 | Kazlas et al. |
| 2004/0190114 A1 | 9/2004 | Jacobson et al. |
| 2004/0263947 A1 | 12/2004 | Drzaic et al. |
| 2005/0001810 A1 | 1/2005 | Yakushiji et al. |
| 2005/0007336 A1 | 1/2005 | Albert et al. |
| 2005/0012980 A1 | 1/2005 | Wilcox et al. |
| 2005/0018273 A1 | 1/2005 | Honeyman et al. |
| 2005/0024353 A1 | 2/2005 | Amundson et al. |
| 2005/0062714 A1 | 3/2005 | Zehner et al. |
| 2005/0122284 A1 | 6/2005 | Gates et al. |
| 2005/0122306 A1 | 6/2005 | Wilcox et al. |
| 2005/0122563 A1 | 6/2005 | Honeyman et al. |
| 2005/0124751 A1 | 6/2005 | Klingenberg et al. |
| 2005/0152018 A1 | 7/2005 | Abramson et al. |
| 2005/0156340 A1 | 7/2005 | Valianatos et al. |
| 2005/0179642 A1 | 8/2005 | Wilcox et al. |
| 2005/0212747 A1 | 9/2005 | Amundson |
| 2005/0253777 A1 | 11/2005 | Zehner et al. |
| 2005/0259068 A1 | 11/2005 | Nihei et al. |
| 2005/0280626 A1 | 12/2005 | Amundson et al. |
| 2006/0020062 A1 | 1/2006 | Bloom |
| 2006/0038772 A1 | 2/2006 | Amundson et al. |
| 2006/0087479 A1 | 4/2006 | Sakurai et al. |
| 2006/0087489 A1 | 4/2006 | Sakurai et al. |
| 2006/0087718 A1 | 4/2006 | Takagi et al. |
| 2006/0139308 A1 | 6/2006 | Jacobson et al. |
| 2006/0139310 A1 | 6/2006 | Zehner et al. |
| 2006/0139311 A1 | 6/2006 | Zehner et al. |
| 2006/0176267 A1 | 8/2006 | Honeyman et al. |
| 2006/0181492 A1 | 8/2006 | Gates et al. |
| 2006/0181504 A1 | 8/2006 | Kawai |
| 2006/0194619 A1 | 8/2006 | Wilcox et al. |
| 2006/0197737 A1 | 9/2006 | Baucom et al. |
| 2006/0197738 A1 | 9/2006 | Kawai |
| 2006/0202949 A1 | 9/2006 | Danner et al. |
| 2006/0209008 A1 | 9/2006 | Nihei et al. |
| 2006/0214906 A1 | 9/2006 | Kobayashi et al. |
| 2006/0231401 A1 | 10/2006 | Sakurai et al. |
| 2006/0232531 A1 | 10/2006 | Amundson et al. |
| 2006/0238488 A1 | 10/2006 | Nihei et al. |
| 2006/0263927 A1 | 11/2006 | Sakurai et al. |
| 2006/0279527 A1 | 12/2006 | Zehner et al. |
| 2006/0291034 A1 | 12/2006 | Patry et al. |
| 2007/0013683 A1 | 1/2007 | Zhou et al. |
| 2007/0035532 A1 | 2/2007 | Amundson et al. |
| 2007/0035808 A1 | 2/2007 | Amundson et al. |
| 2007/0052757 A1 | 3/2007 | Jacobson |
| 2007/0057908 A1 | 3/2007 | Jacobson |
| 2007/0069247 A1 | 3/2007 | Amundson et al. |
| 2007/0085818 A1 | 4/2007 | Amundson et al. |
| 2007/0091417 A1 | 4/2007 | Cao et al. |
| 2007/0091418 A1 | 4/2007 | Danner et al. |
| 2007/0097489 A1 | 5/2007 | Doshi et al. |
| 2007/0103427 A1 | 5/2007 | Zhou et al. |
| 2007/0109219 A1 | 5/2007 | Whitesides et al. |
| 2007/0146310 A1 | 6/2007 | Paolini et al. |
| 2007/0152956 A1 | 7/2007 | Danner et al. |
| 2007/0153361 A1 | 7/2007 | Danner et al. |
| 2007/0200795 A1 | 8/2007 | Whitesides et al. |
| 2007/0200874 A1 | 8/2007 | Amundson et al. |
| 2007/0211002 A1 | 9/2007 | Zehner et al. |
| 2007/0211331 A1 | 9/2007 | Danner et al. |
| 2007/0223079 A1 | 9/2007 | Honeyman et al. |
| 2007/0247697 A1 * | 10/2007 | Sohn et al. ................. 359/245 |
| 2008/0024482 A1 | 1/2008 | Gates et al. |
| 2008/0074730 A1 | 3/2008 | Cao et al. |
| 2008/0117495 A1 | 5/2008 | Arango et al. |
| 2008/0218839 A1 * | 9/2008 | Paolini et al. ............... 359/274 |
| 2008/0309350 A1 * | 12/2008 | Danner et al. ............... 324/537 |
| 2008/0316582 A1 * | 12/2008 | Danner et al. ............... 359/296 |
| 2009/0000729 A1 * | 1/2009 | Danner et al. ............... 156/256 |

FOREIGN PATENT DOCUMENTS

| | | |
|---|---|---|
| EP | 1 145 072 B1 | 5/2003 |
| WO | WO 00/36560 | 6/2000 |
| WO | WO 00/38000 | 6/2000 |
| WO | WO 00/67110 | 11/2000 |
| WO | WO 01/07961 | 2/2001 |
| WO | WO 2004/079442 | 9/2004 |

OTHER PUBLICATIONS

Amundson, K., et al., "Flexible, Active-Matric Display Constructed Using a Microencapsulated Electrophoretic Material and an Organic-Semiconductor-Based Backplane", SID 01 Digest, 160 (Jun. 2001).

Au, J. et al., "Ultra-Thin 3.1-in. Active-Matrix Electronic Ink Display for Mobile Devices", IDW'02, 223 (2002).

Bach, U. et al., "Nanomaterials-Based Electrochromics for Paper-Quality Displays", Adv. Mater, 14(11), 845 (2002).

Bouchard, A. et al., "High-Resolution Microencapsulated Electrophoretic Display on Silicon", SID 04 Digest, 651 (2004).

Caillot, E. et al. "Active Matrix Electrophoretic Information Display for High Performance Mobile Devices", IDMC Proceedings (2003).

Chen, Y., et al., "A Conformable Electronic Ink Display using a Foil-Based a-Si TFT Array",SID 01 Digest, 157 (Jun. 2001).

Comiskey, B., et al., "An electrophoretic ink for all-printed refelctive electronic displays", Nature, 394, 253 (1998).

Comiskey, B., et al., "Electrophoretic Ink: A Printable Display Material", SID 97 Digest (1997), p. 75.

Danner, G.M. et al., "Reliability Performance for Microencapsulated Electrophoretic Displays with Simulated Active Matrix Drive", SID 03 Digest, 573 (2003).

Drzaic, P., et al., "A Printed and Rollable Bistable Electronic Display", SID 98 Digest (1998), p. 1131.

Duthaler, G., et al., "Active-Matrix Color Displays Using Electrophoretic Ink and Color Filters", SID o2 Digest, 1374 (2002).

Gates, H. et al., "A5 Sized Electronic Paper Display for Document Viewing", SID 05 Digest, (2005).

Hayes, R.A., et al., "Video-Speed Electronic Paper Based on Electrowetting", Nature, vol. 425, Sep. 25, pp. 383-385 (2003).

Henzen, A. et al., "An Electronic Ink Low Latency Drawing Tablet", SID 04 Digest, 1070 (2004).

Henzen, A. et al., "Development of Active Matrix Electronic Ink Displays for Handheld Devices", SID 03 Digest, 176, (2003).

Henzen, A. et al., "Development of Active Matrix Electronic Ink Displays for Smart Handheld Applications", IDW'02, 227 (2002).

Jacobson, J., et al., "The last book", IBM Systems J., 36, 457 (1997).

Jo, G-R, et al., "Toner Display Based on Particle Movements", Chem. Mater, 14, 664 (2002).

Johnson, M. et al., "High Quality Images on Electronic Paper Displays", SID 05 Digest, 1666 (2005).

Kazlas, P. et al., "Card-size Active-matrix Electronic Ink Display", Eurodisplay 2002, 259 (2002).

Kazlas, P., et al., "12.1" SVGA Microencapsulated Electrophoretic Active Matrix Display for Information Appliances, SID 01 Digest, 152 (Jun. 2001).

Kitamura, T., et al., "Electrical toner movement for electronic paper-like display", Asia Display/IDW '01, p. 1517, Paper HCS1-1 (2001).

O'Regan, B. et al., "A Low Cost, High-efficiency Solar Cell Based on Dye-sensitized colloidal $TiO_2$ Films", Nature, vol. 353, Oct. 24, 1991, 773-740.

Pitt, M.G., et al., "Power Consumption of Microencapsulated Eletrophoretic Displays for Smart Handheld Applications", SID 02 Digest, 1378 (2002).

Webber, R., "Image Stability in Active-Matrix Microencapsulated Electrophoretic Displays", SID 02 Digest, 126 (2002).

Whitesides, T. et al., "Towards Video-rate Microencapsulated Dual-Particle Electrophoretic Displays", SID 04 Digest, 133 (2004).

Wood, D., "An Electrochromic Renaissance?" Information Display, 18(3), 24 (Mar. 2002).

Yamaguchi, Y., et al., "Toner display using insulative particles charged triboelectrically", Asia Display/IDW '01, p. 1729, Paper AMD4-4 (2001).

Zehner, R. et al., "Drive Waveforms for Active Matrix Electrophoretic Displays", SID 03 Digest, 842 (2003).

* cited by examiner

ELECTRO-OPTIC DISPLAYS, AND MATERIALS FOR USE THEREIN

REFERENCE TO RELATED APPLICATIONS

This application is a continuation-in-part of application Ser. No. 11/613,259, filed Dec. 20, 2006, which is itself a divisional of application Ser. No. 10/904,351, filed Nov. 5, 2004 (now U.S. Pat. No. 7,173,752, issued Feb. 6, 2007), which itself claims benefit of Application Ser. No. 60/481, 600, filed Nov. 5, 2003, of Application Ser. No. 60/481,605, filed Nov. 6, 2003, and of Application Ser. No. 60/481,787, filed Dec. 14, 2003.

This application is related to:
(a) U.S. Pat. No. 6,831,769;
(b) copending application Ser. No. 10/898,027, filed Jul. 23, 2004 (Publication No. 2005/0122563);
(c) U.S. Pat. No. 7,012,735;
(d) U.S. Pat. No. 7,110,164.

The entire contents of the aforementioned applications and patents are herein incorporated by reference. The entire contents of all United States patents and published and copending applications mentioned below are also herein incorporated by reference.

BACKGROUND OF INVENTION

The present invention relates to electro-optic displays and to materials for use therein. More specifically, this invention relates the prevention of void growth in electro-optic displays.

The present invention is especially, though not exclusively, intended for use in displays containing encapsulated electrophoretic media. Certain materials provided by the present invention may be useful in applications other than electro-optic displays.

As discussed in the aforementioned U.S. Pat. No. 7,173, 752, electro-optic displays comprise a layer of electro-optic material, a term which is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

In the displays of the present invention, the electro-optic medium will typically be a solid (such displays may hereinafter for convenience be referred to as "solid electro-optic displays"), in the sense that the electro-optic medium has solid external surfaces, although the medium may, and often does, have internal liquid- or gas-filled spaces. Thus, the term "solid electro-optic displays" includes encapsulated electrophoretic displays, encapsulated liquid crystal displays, and other types of displays discussed below.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Several types of electro-optic displays are known. One type of electro-optic display is a rotating bichromal member type as described, for example, in U.S. Pat. Nos. 5,808,783; 5,777, 782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870.657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in copending application Ser. No. 10/711,802, filed Oct. 6, 2004 (Publication No. 2005/0151709), that such electro-wetting displays can be made bistable.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Patent Publication No. 2005/0001810; European Patent Applications 1,462,847; 1,482,354; 1,484,635; 1,500,971; 1,501,194; 1,536,271; 1,542,067; 1,577,702; 1,577,703; and 1,598,694; and International Applications WO 2004/090626; WO 2004/079442; and WO 2004/001498. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation have recently been published describing encapsulated electrophoretic media. Such encapsulated media comprise numerous small capsules, each of which itself comprises an internal phase containing electrophoretically-mobile particles suspended in a liquid suspending medium, and a capsule wall surrounding the internal phase. Typically, the capsules are themselves held within a polymeric binder to form a coherent layer positioned between two electrodes. Encapsulated media of this type are described, for example, in U.S. Pat. Nos. 5,930,026; 5,961,804; 6,017,584; 6,067,185; 6,118,426; 6,120,588; 6,120,839; 6,124,851; 6,130,773; 6,130,774; 6,172,798; 6,177,921; 6,232,950; 6,249,271; 6,252,564; 6,262,706; 6,262,833; 6,300,932; 6,312,304; 6,312,971; 6,323,989; 6,327,072; 6,376,828; 6,377,387; 6,392,785; 6,392,786; 6,413,790; 6,422,687; 6,445,374; 6,445,489; 6,459,418; 6,473,072; 6,480,182; 6,498,114; 6,504,524; 6,506,438; 6,512,354; 6,515,649; 6,518,949; 6,521,489; 6,531,997; 6,535,197; 6,538,801; 6,545,291; 6,580,545; 6,639,578; 6,652,075; 6,657,772; 6,664,944; 6,680,725; 6,683,333; 6,704,133; 6,710,540; 6,721,083; 6,724,519; 6,727,881; 6,738,050; 6,750,473; 6,753,999; 6,816,147; 6,819,471; 6,822,782; 6,825,068; 6,825,829; 6,825,970; 6,831,769; 6,839,158; 6,842,167; 6,842,279; 6,842,657; 6,864,875; 6,865,010; 6,866,760; 6,870,661; 6,900,851; 6,922,276; 6,950,200; 6,958,848; 6,967,640; 6,982,178; 6,987,603; 6,995,550; 7,002,728; 7,012,600; 7,012,735; 7,023,420; 7,030,412; 7,030,854; 7,034,783; 7,038,655; 7,061,663; 7,071,913; 7,075,502; 7,075,703; 7,079,305; 7,106,296; 7,109,968; 7,110,163; 7,110,164; 7,116,318; 7,116,466; 7,119,759; 7,119,772; 7,148,128; 7,167,155; 7,170,670; 7,173,752; 7,176,880; 7,180,649; 7,190,008; 7,193,625; 7,202,847; 7,202,991; 7,206,119; and 7,223,672; and U.S. Patent Applications Publication Nos. 2002/0060321; 2002/0090980; 2003/0011560; 2003/0102858; 2003/0151702; 2003/0222315; 2004/0094422; 2004/0105036; 2004/0112750; 2004/0119681; 2004/0136048; 2004/0155857; 2004/0180476; 2004/0190114; 2004/0196215; 2004/0226820; 2004/0257635; 2004/0263947; 2005/0000813; 2005/0007336; 2005/0012980; 2005/0017944; 2005/0018273; 2005/0024353; 2005/0062714; 2005/0067656; 2005/0099672; 2005/0122284; 2005/0122306; 2005/0122563; 2005/0134554; 2005/0146774; 2005/0151709; 2005/0152018; 2005/0156340; 2005/0168799; 2005/0179642; 2005/0190137; 2005/0212747; 2005/0213191; 2005/0219184; 2005/0253777; 2005/0280626; 2006/0007527; 2006/0024437; 2006/0038772; 2006/0139308; 2006/0139310; 2006/0139311; 2006/0176267; 2006/0181492; 2006/0181504; 2006/0194619; 2006/0197736; 2006/0197737; 2006/0197738; 2006/0202949; 2006/0209388; 2006/0223282; 2006/0232531; 2006/0245038; 2006/0256425; 2006/0262060; 2006/0279527; 2006/0291034; 2007/0035532; 2007/0035808; 2007/0052757; 2007/0057908; 2007/0069247; 2007/0085818; 2007/0091417; 2007/0091418; 2007/0097489; and 2007/0109219; and International Applications Publication Nos. WO 00/38000; WO 00/36560; WO 00/67110; and WO 01/07961; and European Patents Nos. 1,099,207 B1; and 1,145,072 B1.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, the aforementioned U.S. Pat. Nos. 6,130,774 and 6,172,798, and U.S. Pat. Nos. 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See US Patent Publication Number 2004/0226820); and other similar techniques.) Thus, the resulting display can be flexible. Further, because the display medium can be printed (using a variety of methods), the display itself can be made inexpensively.

Other types of electro-optic media may also be used in the displays of the present invention.

In addition to the layer of electro-optic material, an electro-optic display normally comprises at least two other layers disposed on opposed sides of the electro-optic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electro-optic display, which is intended for use with a stylus, print head or similar movable electrode separate from the display, only one of the layers adjacent the electro-optic layer comprises an electrode, the layer on the opposed side of the electro-optic layer typically being a protective layer intended to prevent the movable electrode damaging the electro-optic layer.

The manufacture of a three-layer electro-optic display normally involves at least one lamination operation. For example, in several of the aforementioned MIT and E Ink patents and applications, there is described a process for manufacturing an encapsulated electrophoretic display in which an encapsulated electrophoretic medium comprising capsules in a binder is coated on to a flexible substrate comprising indium-tin-oxide (ITO) or a similar conductive coating (which acts as an one electrode of the final display) on a plastic film, the capsules/binder coating being dried to form a coherent layer of the electrophoretic medium firmly adhered to the substrate. Separately, a backplane, containing an array of pixel electrodes and an appropriate arrangement of conductors to connect the pixel electrodes to drive circuitry, is prepared. To form the final display, the substrate having the capsule/binder layer thereon is laminated to the backplane using a lamination adhesive. (A very similar process can be used to prepare an electrophoretic display usable with a stylus or similar movable electrode by replacing the backplane with a simple protective layer, such as a plastic film, over which the stylus or other movable electrode can slide.) In one preferred form of such a process, the backplane is itself flexible and is prepared by printing the pixel electrodes and conductors on a plastic film or other flexible substrate. The obvious lamination technique for mass production of displays by this process is roll lamination using a lamination adhesive. Similar manufacturing techniques can be used with other types of electro-optic displays. For example, a microcell electrophoretic medium or a rotating bichromal member medium may be laminated to a backplane in substantially the same manner as an encapsulated electrophoretic medium.

In the processes described above, the lamination of the substrate carrying the electro-optic layer to the backplane may advantageously be carried out by vacuum lamination. Vacuum lamination is effective in expelling air from between the two materials being laminated, thus avoiding unwanted air bubbles in the final display; such air bubbles may introduce undesirable artifacts in the images produced on the display. However, vacuum lamination of the two parts of an electro-optic display in this manner imposes stringent requirements upon the lamination adhesive used, especially in the case of a display using an encapsulated electrophoretic medium. The lamination adhesive should have sufficient adhesive strength to bind the electro-optic layer to the layer (typically an electrode layer) to which it is to be laminated, and in the case of an encapsulated electrophoretic medium, the adhesive should also have sufficient adhesive strength to mechanically hold the capsules together. If the electro-optic display is to be of a flexible type (and one of the important advantages of rotating bichromal member and encapsulated electrophoretic displays is that they can be made flexible), the adhesive should have sufficient flexibility not to introduce defects into the display when the display is flexed. The lamination adhesive should have adequate flow properties at the lamination temperature to ensure high quality lamination, and in this regard, the demands of laminating encapsulated electrophoretic and some other types of electro-optic media are unusually difficult; the lamination has be conducted at a temperature of not more than about 130° C. since the medium cannot be exposed to substantially higher temperatures without damage, but the flow of the adhesive must cope with the relatively uneven surface of the capsule-containing layer, the surface of which is rendered irregular by the underlying capsules. The lamination temperature should indeed be kept as low as possible, and room temperature lamination would be ideal, but no commercial adhesive has been found which permits such room temperature lamination. The lamination adhesive should be chemically compatible with all the other materials in the display.

As discussed in detail in the aforementioned U.S. Pat. No. 6,831,769, a lamination adhesive used in an electro-optic display should meet certain electrical criteria, and this introduces considerable problems in the selection of the lamination adhesive. Commercial manufacturers of lamination adhesives naturally devote considerable effort to ensuring that properties, such as strength of adhesion and lamination temperatures, of such adhesives are adjusted so that the adhesives perform well in their major applications, which typically involve laminating polymeric and similar films. However, in such applications, the electrical properties of the lamination adhesive are not relevant, and consequently the commercial manufacturers pay no heed to such electrical properties. Indeed, substantial variations (of up to several fold) in certain electrical properties may exist between different batches of the same commercial lamination adhesive, presumably because the manufacturer was attempting to optimize non-electrical properties of the lamination adhesive (for example, resistance to bacterial growth) and was not at all concerned about resulting changes in electrical properties.

However, in electro-optic displays, in which the lamination adhesive is normally located between the electrodes, which apply the electric field needed to change the electrical state of the electro-optic medium, the electrical properties of the adhesive may become crucial. As will be apparent to electrical engineers, the volume resistivity of the lamination adhesive becomes important, since the voltage drop across the electro-optic medium is essentially equal to the voltage drop across the electrodes, minus the voltage drop across the lamination adhesive. If the resistivity of the adhesive layer is too high, a substantial voltage drop will occur within the adhesive layer, requiring an increase in voltage across the electrodes. Increasing the voltage across the electrodes in this manner is undesirable, since it increases the power consumption of the display, and may require the use of more complex and expensive control circuitry to handle the increased voltage involved. On the other hand, if the adhesive layer, which extends continuously across the display, is in contact with a matrix of electrodes, as in an active matrix display, the volume resistivity of the adhesive layer should not be too low, or lateral conduction of electric current through the continuous adhesive layer may cause undesirable cross-talk between adjacent electrodes. Also, since the volume resistivity of most materials decreases rapidly with increasing temperature, if the volume resistivity of the adhesive is too low, the performance of the display at temperatures substantially above room temperature is adversely affected. For these reasons, there is an optimum range of lamination adhesive resistivity values for use with any given electro-optic medium, this range varying with the resistivity of the electro-optic medium. The volume resistivities of encapsulated electrophoretic media are typically around 1010 ohm cm, and the resistivities of other electro-optic media are usually of the same order of magnitude. Accordingly, the volume resistivity of the lamination adhesive should normally be around 108 to 1012 ohm cm, or about $10^9$ to $10^{11}$ ohm cm, at the operating temperature of the display, typically around 20° C. The lamination adhesive should also have a variation of volume resistivity with temperature which is similar to that of the electro-optic medium itself.

The number of commercial materials which can meet most of the previously discussed, rather disparate requirements for a lamination adhesive for use in an electro-optic display is small, and in practice a small number of water-dispersed urethane emulsions have been used for this purpose. A similar group of materials have been used as the binder for an encapsulated electrophoretic medium.

However, the use of such polyester-based urethane emulsions as lamination adhesives is still a not entirely satisfactory compromise between the desired mechanical and electrical properties. Lamination adhesives such as acrylic polymers and pressure sensitive adhesives are available with much better mechanical properties, but the electrical properties of these materials are unsuitable for use in electro-optic displays. Moreover, hitherto there has been no satisfactory way of varying the electrical properties of the urethane emulsions to "fine tune" them to match the electrical properties of a specific electro-optic medium. Accordingly, it would be highly advantageous if some way could be found to "decouple" the mechanical and electrical properties of a lamination adhesive so that each set of properties could be optimized separately, i.e., in practice, one could choose an adhesive with highly desirable mechanical properties and then optimize its electrical properties for use with a specific electro-optic medium. One aspect of the present invention provides a way of varying the electrical properties of an adhesive without substantially affecting its mechanical properties. The present invention may also be used to vary the electrical properties of a binder without substantially affecting its mechanical properties.

Furthermore, in considering the choice of a lamination adhesive for use in an electro-optic display, attention must be paid to the process by which the display is to be assembled. Most prior art methods for final lamination of electrophoretic displays are essentially batch methods in which the electro-optic medium, the lamination adhesive and the backplane are only brought together immediately prior to final assembly, and it is desirable to provide methods better adapted for mass production. However, the aforementioned U.S. Pat. No. 6,982,178 describes a method of assembling a solid electro-optic display (including an encapsulated electrophoretic display) which is well adapted for mass production. Essentially, this patent describes a so-called "front plane laminate" ("FPL") which comprises, in order, a light-transmissive electrically-conductive layer; a layer of a solid electro-optic medium in electrical contact with the electrically-conductive layer; an adhesive layer; and a release sheet. Typically, the light-transmissive electrically-conductive layer will be carried on a light-transmissive substrate, which is preferably flexible, in the sense that the substrate can be manually wrapped around a drum (say) 10 inches (254 mm) in diameter without permanent deformation. The term "light-transmissive" is used in this patent and herein to mean that the layer thus designated transmits sufficient light to enable an observer, looking through that layer, to observe the change in display states of the electro-optic medium, which will normally be viewed through the electrically-conductive layer and adjacent substrate (if present); in cases where the electro-optic medium displays a change in reflectivity at non-visible wavelengths, the term "light-transmissive" should of course be interpreted to refer to transmission of the relevant non-visible wavelengths. The substrate will typically be a polymeric film, and will normally have a thickness in the range of about 1 to about 25 mil (25 to 634 µm), preferably about 2 to about 10 mil (51 to 254 µm). The electrically-conductive layer is conveniently a thin metal or metal oxide layer of, for example, aluminum or ITO, or may be a conductive polymer. Poly(ethylene terephthalate) (PET) films coated with aluminum or ITO are available commercially, for example as "aluminized Mylar" ("Mylar" is a Registered Trade Mark) from E.I. du Pont de Nemours & Company, Wilmington Del., and such commercial materials may be used with good results in the front plane laminate.

Assembly of an electro-optic display using such a front plane laminate may be effected by removing the release sheet from the front plane laminate and contacting the adhesive layer with the backplane under conditions effective to cause the adhesive layer to adhere to the backplane, thereby securing the adhesive layer, layer of electro-optic medium and electrically-conductive layer to the backplane. This process is well-adapted to mass production since the front plane laminate may be mass produced, typically using roll-to-roll coating techniques, and then cut into pieces of any size needed for use with specific backplanes.

The aforementioned U.S. Pat. No. 6,982,178 also describes a method for testing the electro-optic medium in a front plane laminate prior to incorporation of the front plane laminate into a display. In this testing method, the release sheet is provided with an electrically conductive layer, and a voltage sufficient to change the optical state of the electro-optic medium is applied between this electrically conductive layer and the electrically conductive layer on the opposed side of the electro-optic medium. Observation of the electro-optic medium will then reveal any faults in the medium, thus avoiding laminating faulty electro-optic medium into a display, with the resultant cost of scrapping the entire display, not merely the faulty front plane laminate.

The aforementioned U.S. Pat. No. 6,982,178 also describes a second method for testing the electro-optic medium in a front plane laminate by placing an electrostatic charge on the release sheet, thus forming an image on the electro-optic medium. This image is then observed in the same way as before to detect any faults in the electro-optic medium.

The aforementioned 2004/0155857 describes a so-called "double release sheet" which is essentially a simplified version of the front plane laminate of the aforementioned U.S. Pat. No. 6,982,178. One form of the double release sheet comprises a layer of a solid electro-optic medium sandwiched between two adhesive layers, one or both of the adhesive layers being covered by a release sheet. Another form of the double release sheet comprises a layer of a solid electro-optic medium sandwiched between two release sheets. Both forms of the double release film are intended for use in a process generally similar to the process for assembling an electro-optic display from a front plane laminate already described, but involving two separate laminations; typically, in a first lamination the double release sheet is laminated to a front electrode to form a front sub-assembly, and then in a second lamination the front sub-assembly is laminated to a backplane to form the final display, although the order of these two laminations could be reversed if desired.

The aforementioned 2007/0109219 describes a so-called "inverted front plane laminate", which is a variant of the front plane laminate described in the aforementioned U.S. Pat. No. 6,982,178. This inverted front plane laminate comprises, in order, at least one of a light-transmissive protective layer and a light-transmissive electrically-conductive layer; an adhesive layer; a layer of a solid electro-optic medium; and a release sheet. This inverted front plane laminate is used to form an electro-optic display having a layer of lamination adhesive between the electro-optic layer and the front electrode or front substrate; a second, typically thin layer of adhesive may or may not be present between the electro-optic layer and a backplane. Such electro-optic displays can combine good resolution with good low temperature performance.

The aforementioned 2007/0109219 also describes various methods designed for high volume manufacture of electro-optic displays using inverted front plane laminates; preferred forms of these methods are "multi-up" methods designed to allow lamination of components for a plurality of electro-optic displays at one time.

In view of the advantages of the assembly method using a front plane laminate described in the aforementioned U.S. Pat. No. 6,982,178, it is desirable that a lamination adhesive be capable of being incorporated into such a front plane laminate. It is also desirable that a lamination adhesive be capable of being incorporated into a double release film and into an inverted front plane laminate as previously described.

As already mentioned, the lamination processes used to manufacture electro-optic displays impose stringent requirements upon both the mechanical and electrical properties of the lamination adhesive. In the final display, the lamination adhesive is located between the electrodes which apply the electric field needed to change the electrical state of the electro-optic medium, so that the electrical properties of the adhesive become crucial. As will be apparent to electrical engineers, the volume resistivity of the lamination adhesive becomes important, since the voltage drop across the electro-optic medium is essentially equal to the voltage drop across the electrodes, minus the voltage drop across the lamination adhesive. If the resistivity of the adhesive layer is too high, a substantial voltage drop will occur within the adhesive layer, requiring an increase in voltage across the electrodes. Increasing the voltage across the electrodes in this manner is undesirable, since it increases the power consumption of the display, and may require the use of more complex and expensive control circuitry to handle the increased voltage involved.

However, there are other constraints which the lamination adhesive must satisfy. Void growth may be encountered in various types of solid electro-optic displays, and to ensure a high quality display, it is essential that the final display be free from voids, since such voids produce visible defects in images written on the display, as illustrated below. To ensure that the final display is free from voids, it is essential that both the lamination to form the front plane laminate (when effected) and the final lamination to the backplane be carried out without the formation of voids. It is also necessary that the final display be able to withstand substantial temperature changes (such as may occur, for example, when a portable computer or personal digital assistant is removed from an air-conditioned car to outdoor sun on a hot day) without inducing or aggravating the formation of voids, since it has been found that some displays, which initially appear essentially free from voids, can develop objectionable voids when exposed to such temperature changes. This phenomenon may be termed "void re-growth".

It has previously been determined that when the preferred type of display described in the aforementioned U.S. Pat. No. 6,982,178, and comprising an encapsulated electrophoretic medium laminated to a thin film transistor (TFT) backplane by means of a polyurethane lamination adhesive, is exposed to high temperatures (say 70-90° C.) for an extended period (in excess of about 10 hours), voids begin to appear at the interface between the lamination adhesive and the backplane, and grow to produce air gaps between the lamination adhesive and the backplane. These air gaps result in visible defects in an image formed on the electrophoretic medium, since the electrophoretic medium will not switch between its optical states in the areas affected by the air gaps. Eventually, the voids and associated non-switching areas can grow to large sizes, typically about 1 to 5 mm in diameter.

The aforementioned U.S. Pat. No. 7,173,752 and copending application Ser. No. 11/613,259 describe the use of thermal cross-linking agents in adhesive layers to reduce void growth in electro-optic displays. The cross-linking agent may comprise an epoxy group, which may be in the form of a glycidyl grouping (i.e., an epoxymethyl grouping). The cross-linking agent may also comprise a tertiary amine. A specific preferred cross-linking agent described is N,N-diglycidylaniline, which may be present in the adhesive layer in a concentration of at least about 5,000, and preferably at least about 10,000, parts per million by weight. Other useful types of cross-linking agents include epoxy ethers of alkyl or cycloalkyl polyols having at least two hydroxyl groups, and polymers having a main chain and a plurality of epoxy groups depending from the main chain. Specific useful cross-linking agents described include 1,4-cyclohexanedimethanol diglycidyl ether, neopentyl glycol diglycidyl ether, O,O,O-triglycidyl-glycerol, and homopolymers and copolymers of glycidyl methacrylate.

The thermal cross-linking agents described in the aforementioned U.S. Pat. No. 7,173,752 and copending application Ser. No. 11/613,259 are highly effective in reducing void growth because they provide a cured adhesive layer that is sufficiently stiff to be resistant to high temperature void growth flexible enough to provide good adhesion between the various layers of the electro-optic display, especially where both the front substrate and the backplane of the display are flexible. However, these cross-linking agents do have certain problems from a manufacturing point of view. Typically, in the manufacture of a front plane laminate, inverted front plane laminate or double release sheet, an electro-optic layer (for example, a microencapsulated or polymer-dispersed electrophoretic layer) is coated on to a substrate (which may in some cases be only a release sheet), and the resultant substrate/electro-optic layer sub-assembly is then laminated, normally under heat and pressure, to an adhesive layer which has previously been coated on to a release sheet. Heating the adhesive layer during the lamination allows the adhesive material to flow and thus smooth out any surface irregularities on the adjacent surface of the electro-optic layer.

When using the thermal cross-linking agents described in the aforementioned U.S. Pat. No. 7,173,752 and copending application Ser. No. 11/613,259, the lamination of the electro-optic layer to the adhesive layer must be performed before the cross-linking reaction is carried out or poor lamination quality will result. Consequently, an adhesive/cross-linking agent mixture must be stored before application to the electro-optic layer. Since the cross-linking reaction is thermally initiated, the reaction proceeds slowly at room temperature; in the case of the preferred N,N-diglycidylaniline, the reaction proceeds to an unacceptable extent in less than one week at room temperature. Storing the adhesive/cross-linking agent mixture under refrigeration at 5° C. extends the shelf life of the mixture for up to 8 weeks, but is generally inconvenient in a manufacturing environment. The relative short shelf life of such adhesive/cross-linking agent mixtures is limiting for certain types of manufacturing process flows and inventory; for example, it may be necessary to prepare small batches of adhesive/cross-linking agent mixture at frequent intervals and to coat the mixture and use up the coated adhesive layer within a short period, whereas it would often be more convenient from a manufacturing standpoint to mix and coat large batches of adhesive which could be stored and used as desired.

It has now been found that the use of epoxidized vegetable oils as thermal cross-linking agents in adhesives improves the shelf life of the adhesive/cross-linking agent mixture while still permitting complete curing at relatively low temperatures and giving good protection against void growth

SUMMARY OF THE INVENTION

Accordingly, in one aspect, this invention provides an electro-optic display comprising:

a layer of solid electro-optic material capable of changing at least one optical characteristic upon application of an electric field thereto;

a backplane comprising at least one electrode arranged to apply an electric field to the layer of electro-optic material; and an adhesive layer disposed between the layer of electro-optic material and the backplane and adhesively securing the layer of electro-optic material to the backplane, the adhesive layer comprising a thermally-activated cross-linking agent capable, upon exposure to an activation temperature, of cross-linking the adhesive layer, the cross-linking agent comprising an epoxidized vegetable oil fatty acid or an epoxidized ester of such a fatty acid.

The most common epoxidized vegetable oil fatty acids and esters are derived from soybean and linseed oils. The epoxidized fatty acid or ester may be of the type described in U.S. Patent Application Publication No. 2006/0020062. This published application describes coating compositions comprising a latex resin and a $C_{1-6}$ alkyl, $C_{2-6}$ alkenyl, epoxidized $C_{2-6}$ alkenyl, monoglycerol, diglycerol, $C_{4-6}$ polyol or glycol ester of a vegetable oil fatty acid, wherein the ester has at least one oxirane ring formed between two adjacent carbons in the carbon chain of the fatty acid. A specific commercial epoxidized oil which has been found useful in the present invention is that sold as Vikoflex 7190 ("VIKOFLEX" is a Registered Trade Mark) by Arkema Inc, 2000 Market Street, Philadelphia Pa. 19103-3222. This material is stated by the manufacturer to be an epoxidized linseed oil with an oxirane oxygen content of 9 percent, which appears to imply an average of about 6 oxirane groups per molecule. (For reasons discussed below, it may be advantageous to use an epoxidized oil or ester having at least about three epoxy groups per molecule.) The epoxidized oil or ester may be present in the adhesive layer in a concentration of at least about 5,000, and preferably at least about 10,000, parts per million by weight. Typically, the optimum concentration of the cross-linking agent appears to be about 20,000 to about 40,000 parts per million by weight. Vikoflex 4050, 5075, 7010, 7040, 7080, 7170, 9010, 9040 and 9080 from the same manufacturer have also proved useful in the present invention. The CAS numbers and other data given by the manufacturer for these materials are summarized in Table 1 below.

In the electro-optic display of the present invention, the adhesive layer may comprise a polyurethane, typically formed from an aqueous polyurethane latex. Suitable aqueous polyurethane latices are commercially available and their preparation is well known in the art. Typically, such aqueous polyurethane latices comprise a polyurethane-polyurea polymer that is formed by reaction of at least one isocyanate with a polyol and a polyamine. Various commercially available isocyanates, polyols and polyamines can be used to form the polyurethane-polyurea polymer. Nonionic or ionic groups are usually added to the polymer chain as an internal emulsifier to make the polymer water dispersible. An ionic stabilized polymer is preferred for use in the present invention as the epoxide groups on the epoxidized oil fatty acid or ester interact primarily with the acid group on the polymer backbone. Carboxylate and sulfonates are primarily used as the ionic emulsifying agents for polyurethane dispersions.

In the electro-optic displays of the present invention, the adhesive layer may contain, in addition to the cross-linking agent, an agent effective to reduce the volume resistivity of the adhesive layer after cross-linking. As discussed in the aforementioned U.S. Pat. No. 7,173,752 and copending application Ser. No. 11/613,259, the volume resistivity reducing agent comprises at least one of a salt, a polyelectrolyte or a hydroxyl containing polymer having a number average molecular weight not greater than about 5000. Preferred volume resistivity reducing agents are quaternary ammonium salts and polyethylene glycols. For example, the volume resistivity reducing agent may comprise tetrabutylammonium chloride, tetrabutylammonium hexafluorophosphate or a polyethylene glycol having a number average molecular weight not greater than about 2000.

This invention also provides a process for producing an electro-optic display, the process comprising:

providing an assembly comprising a layer of solid electro-optic material capable of changing at least one optical characteristic upon application of an electric field thereto; a backplane comprising at least one electrode arranged to apply an electric field to the layer of electro-optic material; and an adhesive layer disposed between the layer of electro-optic material and the backplane and adhesively securing the layer of electro-optic material to the backplane, the adhesive layer comprising a thermally-activated cross-linking agent capable of cross-linking the adhesive layer, the cross-linking agent comprising an epoxidized vegetable oil fatty acid or an epoxidized ester of such a fatty acid; and

TABLE 1

| Trade name | CAS # | Composition | Epoxy Equivalent | |
|---|---|---|---|---|
| | | | Min | Max |
| Vikoflex 7170 | 8013-07-8 | Epoxidized soybean oil | 225 | 233 |
| Vikoflex 7190 | 8016-11-3 | Epoxidized linseed oil | 168 | 175 |
| Vikoflex 4050 | 68082-34-8 | Epoxidized 2-ethylhexyl ester of soya oil fatty acids | 275 | 285 |
| Vikoflex 5075 | | Epoxidized propylene glycol dioleate | 334 | 348 |
| Vikoflex 7010 | | Epoxidized methyl ester of soya fatty acids | 228 | 240 |
| Vikoflex 7040 | | Unknown | 235 | 258 |
| Vikoflex 7080 | | Epoxidized octyl ester of soya fatty acids | 275 | 285 |
| Vikoflex 9010 | | Epoxidized methyl ester of linseed oil fatty acids | 185 | 200 |
| Vikoflex 9040 | | Epoxidized butyl ester of linseed oil fatty acids | 178 | 200 |
| Vikoflex 9080 | 71302-79-9 | Epoxidized 2-ethylhexyl ester of linseed oil fatty acids | 206 | 225 |

Other useful commercial epoxidized oils include those sold under the Registered Trade Mark "FLEXOL" by Dow Chemical Corporation, Midland Mich.

exposing the adhesive layer to a temperature sufficient to activate the cross-linking agent, thereby cross-linking the adhesive layer.

This invention also provides an electro-optic display comprising:
- a layer of solid electro-optic material capable of changing at least one optical characteristic upon application of an electric field thereto;
- a backplane comprising at least one electrode arranged to apply an electric field to the layer of electro-optic material; and
- an adhesive layer disposed between the layer of electro-optic material and the backplane and adhesively securing the layer of electro-optic material to the backplane, the adhesive layer having been cross-linked by a thermally-activated cross-linking agent comprising an epoxidized vegetable oil fatty acid or an epoxidized ester of such a fatty acid.

This invention also provides an article of manufacture (a front plane laminate) comprising in order:
- a light-transmissive electrically-conductive layer;
- a layer of a solid electro-optic medium in electrical contact with the electrically-conductive layer;
- an adhesive layer; and
- a release sheet,
- the adhesive layer comprising a thermally-activated cross-linking agent capable, upon exposure to an activation temperature, of cross-linking the adhesive layer, the cross-linking agent comprising an epoxidized vegetable oil fatty acid or an epoxidized ester of such a fatty acid.

This invention also provides an article of manufacture (a double release film) comprising:
- a layer of a solid electro-optic medium having first and second surfaces on opposed sides thereof;
- a first adhesive layer on the first surface of the layer of solid electro-optic medium;
- a release sheet disposed on the opposed side of the first adhesive layer from the layer of solid electro-optic medium; and
- a second adhesive layer on the second surface of the layer of solid electro-optic medium,
- wherein at least one of the first and second adhesive layers comprises a thermally-activated cross-linking agent capable, upon exposure to an activation temperature, of cross-linking the adhesive layer in which it is present, the cross-linking agent comprising an epoxidized vegetable oil fatty acid or an epoxidized ester of such a fatty acid.

This invention also provides an article of manufacture (an inverted front plane laminate) comprising, in order:
- a release sheet;
- a layer of a solid electro-optic medium;
- an adhesive layer; and
- at least one of a light-transmissive protective layer and a light-transmissive electrically-conductive layer,
- the adhesive layer comprising a thermally-activated cross-linking agent capable, upon exposure to an activation temperature, of cross-linking the adhesive layer, the cross-linking agent comprising an epoxidized vegetable oil fatty acid or an epoxidized ester of such a fatty acid.

The aforementioned front plane laminate, inverted front plane laminate and double release film of the present invention may include any of the optional features of such front plane laminates, inverted front plane laminates and double release films described in the aforementioned patents and applications. Thus, for example a front plane laminate of the present invention may include a conductive via in contact with the conductive layer of the front plane laminate and extending through the electro-optic medium thereof, and a contact pad in contact with the conductive via and arranged to contact an electrode provided on a backplane to which the front plane laminate is to be laminated.

This invention also provides an adhesive composition comprising a polyurethane and a thermal cross-linking agent capable, upon exposure to an activation temperature, of cross-linking the polyurethane, the cross-linking agent comprising an epoxidized vegetable oil fatty acid or an epoxidized ester of such a fatty acid.

Finally, this invention provides a laminate structure comprising first and second layers of solid glass, metal or plastic, and an adhesive layer disposed between the first and second layers and securing the first and second layers to each other, the adhesive layer comprising the adhesive layer comprising a thermally-activated cross-linking agent capable, upon exposure to an activation temperature, of cross-linking the adhesive layer, the cross-linking agent comprising an epoxidized vegetable oil fatty acid or an epoxidized ester of such a fatty acid.

In such a laminate structure, at least one of the first and second layers may have at least one layer of an inorganic, organic or metallized components within or on its surface. The laminate structure may be in the form of a printed circuit board. The cross-linking agent may have an average of at least about three oxirane groups per molecule. The adhesive layer may comprise a polyurethane. The adhesive layer may further comprise an agent effective to reduce the volume resistivity of the adhesive layer after cross-linking.

DETAILED DESCRIPTION

Figure 1:
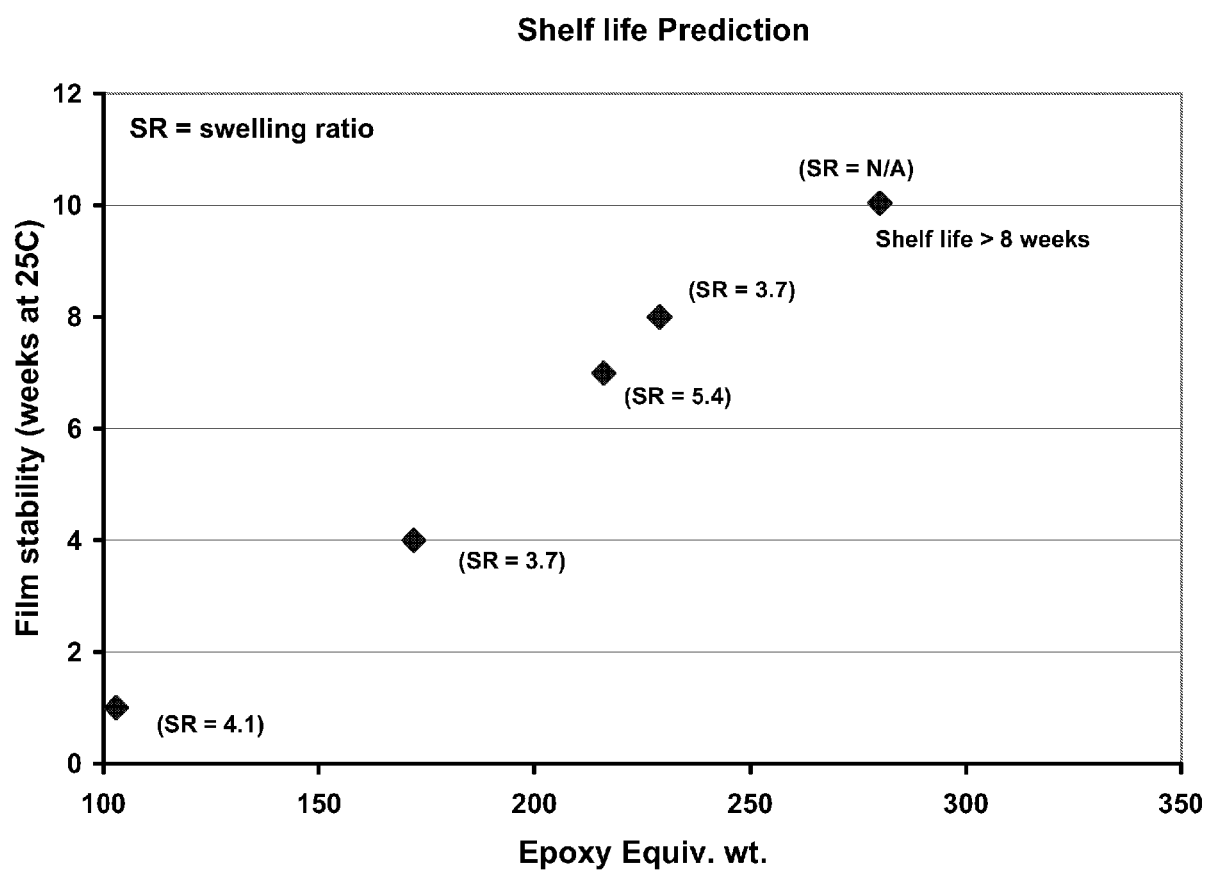
FIG. 1 of the accompanying drawings is graph showing the variation of the shelf life of adhesive compositions of the present invention as a function of the epoxy equivalent weight of the cross-linking agent employed, as determined in the experiments reported in Example 2 below.

As already indicated, the present invention relates to the use, in an adhesive layer of an electro-optic display, of a thermally-activated cross-linking agent capable of cross-linking the adhesive layer, this cross-linking agent being an epoxidized vegetable oil fatty acid or an epoxidized ester of such a fatty acid. This invention also provides a process for producing an electro-optic display with such a cross-linked adhesive layer, an electro-optic display produced by such a process, and components (namely a front plane laminate, inverted front plane laminate and double release film) useful for forming such displays. The use of such a thermally-activated cross-linking agent has been found effective in avoiding the formation of voids in electro-optic displays.

Although the epoxidized vegetable oil fatty acids and esters used in the present invention are known, and indeed commercially available materials, it should be stressed that these materials not been hitherto been used for cross-linking water-based polyurethane polymers. The suggested uses of the epoxidized oils and esters include plasticization of polymeric materials, such as polyvinyl chloride (PVC), polyvinyl alcohol (PVA), chlorinated rubber, nitrocellulose and neoprene; heat and light stabilization of various PVC compounds; pigment dispersion as an outstanding grinding liquid; acid acceptance in chlorinated hydrocarbons, phosphoric acid esters and natural resins; acid scavenging in soy-based ink compounds; and reactive diluents in epoxy resins.

Various types of materials, including aziridines, carbodiimides, polyisocyanates, blocked isocyanates, melamine-formaldehyde and various epoxides, are known to cross-link aqueous polyurethane films. Cross-linking such adhesive films provides various benefits, including improved mechanical integrity, toughness and better solvent resistance. However, the epoxidized vegetable oils and derivatives used in the present invention offer an advantageous balance of good film stability at lower temperatures and production of a highly cross-linked film at moderate temperatures. In contrast, cross-linking agents such as aziridines, carbodiimides, epoxides and polyisocyanates do not have good film stability as they are very reactive even at low temperatures, while other cross-linking agents, such as blocked isocyanates and melamine-formaldehyde, have very good film stability, but require very high curing temperatures to activate the cross-linking reaction. Having good film stability at low temperatures (−10° C. to 30° C.) means that only a minimal amount of cross-linking occurs in a stored film, thus allowing an adhesive film coated on (for example) a release sheet to be stored for a long period before lamination to an electro-optic layer or other coated substrate. As noted above, it is desirable that the cross-linking reaction take place after the two substrates have been laminated together to given void-free lamination and improved mechanical integrity. This is especially critical if one or both substrates have substantial surface irregularities ("high relief") since in this situation substantially non-cross-linked adhesive can flow and cover the entire irregular surface to which it is being laminated, whereas such flow cannot occur if the film cross-links prior to the lamination. Once the two substrates are laminated together, the adhesive containing the epoxidized oil or derivative can be fully cross-linked at a moderate temperature (40° C. to 100° C.). This provides maximum performance from the adhesive and prevents thermal damage to heat-sensitive laminated substrates, and reduces thermal stresses during the cross-linking reaction.

The epoxidized oils and esters used in the present invention possess further advantages over other known cross-linking agents for polyurethanes. There is no release of volatile organic compounds (VOC's) during the cross-linking reaction as there is when using blocked isocyanates or melamines as cross-linking agents. Such VOC's can remain in the adhesive layer, causing unwanted performance issues. Epoxidized oils and esters do not require the addition of catalysts or other additives to promote the cross-linking reaction, and have low toxicity compared to monomeric epoxides, melamines, polyisocyanates and aziridines. Epoxidized oils and esters also offer improved heat and light stability.

It is believed (although the invention is in no way limited by this belief) that in the present invention cross-linking is achieved primarily by the reaction of epoxide groups on the vegetable oil fatty acids or esters with carboxyl groups on the polyurethane (or other) polymer backbone. Some reaction between epoxide groups and amine groups on the polyurethane may also occur. The cross-linking improves both the mechanical and chemical resistance properties of the adhesive.

The optimum amount of cross-linking agent for use in any specific adhesive composition is best determined empirically. However, by way of general guidance it may be stated that a cross-linking agent concentration of at least about 5000 ppm (w/w on a solids basis) is typically needed. In many cases, the optimum proportion of cross-linking agent is greater than about 10000 ppm, and often a proportion of about 20,000 to about 40,000 ppm is desirable to provide sufficient mechanical strength in the cross-linked adhesive to prevent void growth.

The epoxidized fatty acids and esters used in the present invention are oily materials which are relatively difficult to disperse in aqueous media, such as aqueous polyurethane latices. Accordingly, aggressive mixing, typically with a shearing blade mixer, is necessary to ensure that the epoxidized fatty acids and esters are uniformly dispersed in the aqueous latex. If inadequate mixing is used, the coated adhesive layers appear cloudy or have visible droplets of the cross-linker, whereas properly mixed adhesive layers are transparent.

As discussed in the aforementioned U.S. Pat. No. 7,173,752 and copending application Ser. No. 11/613,259, the adhesive compositions of the present invention may comprise an agent effective to reduce the volume resistivity of the adhesive layer after cross-linking. As shown in the Examples below, cross-linking a lamination adhesive in accordance with the present invention tends to increase the volume resistivity of the adhesive. However, as discussed in the aforementioned patent and application, this increase in volume resistivity can be counteracted by adding certain known resistivity-reducing agents, such as a salt, polyelectrolyte or hydroxyl containing polymer, thereby producing a cross-linked adhesive having substantially the same volume resistivity as the non-cross-linked adhesive. Tetrabutylammonium hexafluorophosphate is generally preferred as the volume resistivity reducing agent.

As illustrated in the Examples below, preferred embodiments of the present invention can increase the shelf life of cross-linkable polyurethane adhesive compositions by a factor of about eight, up to about 8 weeks, with only a modest increase (of the order of about 50 percent) in the cross-linking time needed at 60° C.

The following Examples are now given, though by way of illustration only, to show preferred reagents, conditions and techniques used in the cross-linkable adhesives of the present invention.

Example 1

Screening of Possible Cross-Linking Agents

Various commercial cross-linking agents, including carbodiimides, melamine-formaldehyde, blocked isocyanates, epoxy diluents etc. were screened to determine film stability and cross-linking level. Each cross-linking agent was added slowly to a custom aqueous polyurethane dispersion while mixing with low to medium shear with a paddle blade. The polyurethane dispersion was prepared from tetramethylxylene diisocyanate and polypropylene glycol polymer, as described in U.S. Patent Application Publication No. 2005/0124751. After the addition of the cross-linking agent to the dispersion has been completed, mixing was continued for 30 minutes and then the dispersion was allowed to sit for one hour before coating a film of the adhesive composition was coated on to a poly(ethylene terephthalate) (PET) substrate. To determined the stability of the coated films against cross-linking, samples of the coated films were stored at room temperature (25° C.) and in a refrigerator (at 5-10° C.). The film were monitored regularly by immersing a piece of the coated substrate in acetone; if the polyurethane film did not dissolve or break up into gel particles, it was recorded as crosslinked and the time when the cross-linking occurred was recorded. A longer storage time without cross-linking is desirable as it gives a greater permissible period between the initial coating of the adhesive layer and its subsequent lamination to an electro-optic layer or other coated substrate.

The cross-linking level was determined by measuring the ability of the cross-linked adhesive to swell in acetone. The cross-linking reaction was first completed by exposing the films to elevated temperatures (60° C. for 5 days or 85° C. for 50 hours under nitrogen). The film was then cut to a specific size and inserted into a glass dish containing acetone. After one hour, the film size was measured and the value of final length, Lf divided by the initial length, Li cubed or $(Lf/Li)^3$ was recorded as the swelling ratio. The cross-linking density is inversely proportional to the swelling ratio, therefore a lower swelling ratio value designates a higher cross-linking density. The swelling ratio is a relative number so that a control is needed for comparison. Accordingly, in Table 2 below, values are provided for diglycidyl aniline (DGA), a bifunctional monomeric aromatic epoxide which is the preferred cross-linking agent in the aforementioned U.S. Pat. No. 7,173,752. DGA cured films exhibit very high cross-linking density such as is desirable for good performance as a laminating adhesive. Table 2 below shows the curing times at 25° C. and at 5-10° C., and the swelling ratios after curing at the two aforementioned temperatures of the various cross-linking agents which performed the best in this screening study as regards both film stability and swelling ratio.

TABLE 3

| Sample (% x-linker based on solids) | Epoxy equivalent wt. | 25° C. cure (weeks) | 85° C. cure (50 hrs, $N_2$) Swelling in Acetone $(Lf/Li)^3$ |
|---|---|---|---|
| Diglycidyl aniline (5%) | 103 | <1 (6 days) | 4.1 |
| Vikoflex 7190 (10%) | 172 | 4-5 | 3.7 |
| Vikoflex 4050 (10%) | 280 | >8 weeks | De-wetted |
| Vikoflex 9080 (10%) | 216 | 6-7 | 5.4 |
| Vikoflex 7170 (10%) | 229 | 7-8 | 3.7 |

The data in Table 3 confirm that epoxidized fatty acids and esters give good adhesive film stability and high cross-linking density.

Further experiments were conducted to confirm that the increase in film stability time at low temperatures experienced with DGA was also found with the epoxidized fatty acid esters. For this purpose, adhesive compositions containing 8.6 and 14.3 percent by weight (on a solids basis) of Vikoflex 7190 were formulated, coated and tested in the same way as in Example 1 above. The number of days taken for the

TABLE 2

| Sample % cross-linker by solids | 25° C. cure (weeks) | 5-10° C. cure (weeks) | 85° C. cure (50 hrs, $N_2$) Swelling in Acetone $(Lf/Li)^3$ | 60° C. cure (5 days) Swelling in Acetone $(Lf/Li)^3$ |
|---|---|---|---|---|
| Diglycidyl aniline (5%) | <1 | 5 | 4.1 | 3.7 |
| Carbodilite E-02 (5%) | >12 | N/A | dissolves | N/A |
| Carbodilite E-02 (10%) | 1-2 | N/A | 5.4 | 5.4 |
| Carbodilite E-02 (15%) | 1-2 | N/A | 4.1 | N/A |
| Witcobond-XW (2%) | >12 | N/A | gel particles | N/A |
| Witcobond-XW (3.5%) | 3 | N/A | 5.4 | 8 |
| Witcobond-XW (5%) | 3 | 11 | 5.4 | 5.8 |
| Vikoflex 7190 (3%) | 7 | N/A | 4.9 | 6.9 |
| Vikoflex 7190 (5%) | 6 | N/A | 4.5 | 4.9 |
| Vikoflex 7190 (10%) | 5 | >24 | 3.7 | 4.1 |

Although the DGA gave a high cross-linking density, its film stability (as with many cross-linking agents is very low), the film cross-linking in less than a week at room temperature. Witcobond-XW, a bisphenol A epoxy emulsion from Crompton Company, showed better film stability than DGA, but had low cross-linking density even at high concentrations. Carbodilite E-02, a carbodiimide from Nisshinbo Company, showed similar results to DGA, but required higher concentrations of the cross-linker. The epoxidized linseed oil, Vikoflex 7190, showed a dramatic improvement in film stability as compared with DGA with a similar cross-linking density at 10% concentration. Thus, the data in Table 2 indicates that using epoxidized fatty acid esters in accordance with the present invention can give improved adhesive film stability without compromising cross-linking density.

Example 2

Evaluation of Other Epoxidized Fatty Acid Cross-Linking Agents

In view of the results shown in Table 2 above, additional epoxidized fatty acid cross-linking agents were evaluated in the same way as in Example 1, and the results are shown in Table 3 below.

adhesive compositions to gel were 14, 27 and >113 for the 8.6 percent composition at 25, 15 and 5° C. respectively, and 22 and 59 for the 14.3 percent composition at 25 and 15° C. respectively.

FIG. 1 of the accompanying drawings is a graph showing data from Table 3 re-plotted to show shelf life (i.e., cure time at 25°) as a function of the epoxy equivalent weight of the cross-linking agent. From FIG. 1, it will be seen that the shelf life of the adhesive compositions varied approximately linearly with the equivalent weight of the epoxidized fatty acid esters, which all had similar chemical structures.

Example 3

Direct Mechanical Analysis Results

Adhesive compositions containing the same polyurethane as in the previous Examples and 3, 5 and 10 percent (on a solids basis) of Vikoflex 7190 and 5 percent (on a solids basis) of DGA were prepared. Each composition was coated on to a release sheet and dried at 25° C. for approximately 24 hours, the coating weight of the dispersion being controlled so that an adhesive layer 50 μm thick was formed on the release sheet. The adhesive layer was then cured at 85° C. for 50 hours in a nitrogen-purged oven.

Figure 2:
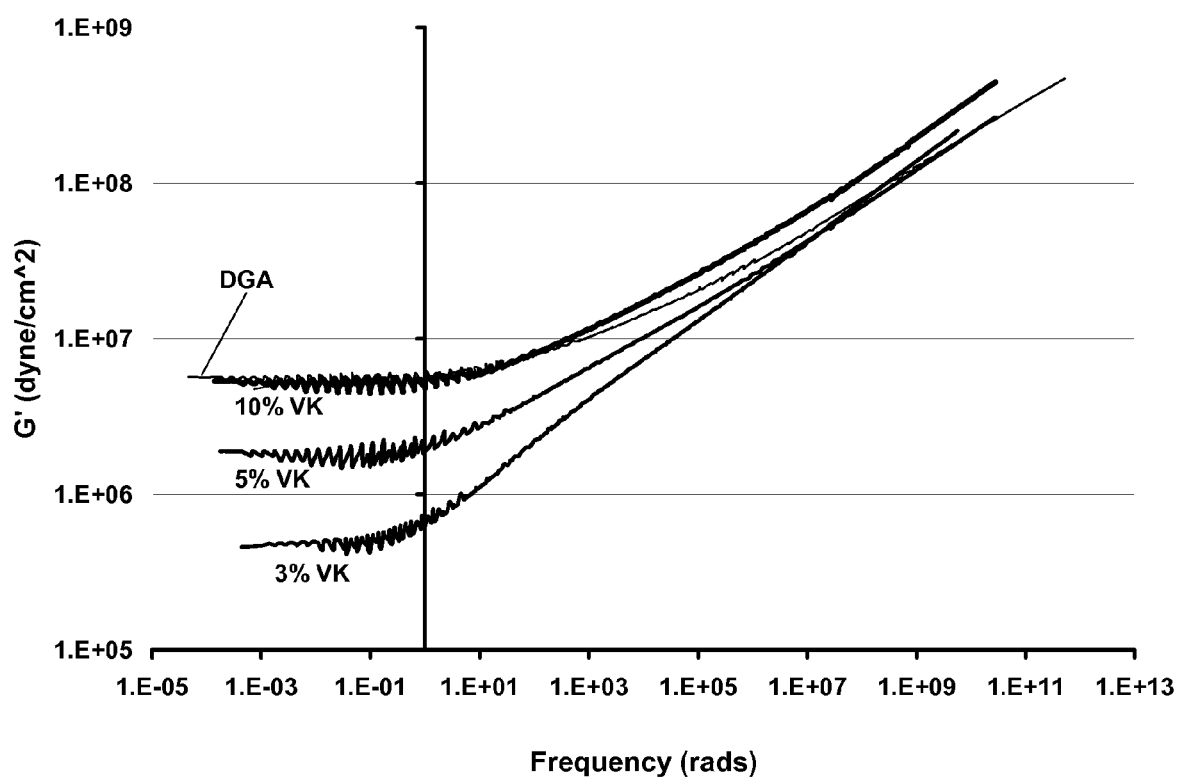
FIG. 2 is a graph showing the variation of the elastic modulus of various adhesive compositions of the present invention with frequency, as determined in the experiments reported in Example 3 below.

The cured adhesive layer was peeled from the release sheet and folded into multiple thicknesses to provide an adhesive layer sufficiently thick for shear modulus testing, which was conducted on a Dynamic Mechanical Analyzer, Model RDA III. The results were converted to corresponding values at 70° C., and the results are shown in FIG. 2 of the accompanying drawings. From FIG. 2 it will be seen that (as expected) the shear modulus (stiffness) of the cured adhesive composition increases with increasing amounts of the Vikoflex 7190 cross-linker in the composition, and that a composition containing 10 percent of this cross-linker has a curve essentially the same as a composition containing 5 percent of DGA.

Example 4

Conductivity of Adhesive Compositions

When adhesive compositions are used in electro-optic displays, the adhesive composition is typically present between the electrodes of the display, and hence the conductivity (typically measured as its inverse, the volume resistivity) of the cross-linked adhesive composition becomes important, since too high a volume resistivity results in a substantial voltage drop across the adhesive layer, and reduced voltage across the electro-optic layer. Accordingly, the volume resistivities of (a) the polyurethane used in the preceding Examples; (b) the same polyurethane with the addition of 5 percent of DGA, cured at 85° C. for 50 hours in a nitrogen-purged oven; and (c) the same polyurethane with the addition of 10 percent of Vikoflex 7190, cured under the same conditions as (b), were measured by standard techniques. The volume resistivities of the same three adhesive compositions were also measured after additions of 200 and 800 ppm of tetrabutylammonium hexafluorophosphate (abbreviated TBAHF6 in FIG. 3), which is known to reduce the volume resistivity of cross-linked polyurethane adhesive compositions. The results are shown in FIG. 3.

Figure 3:
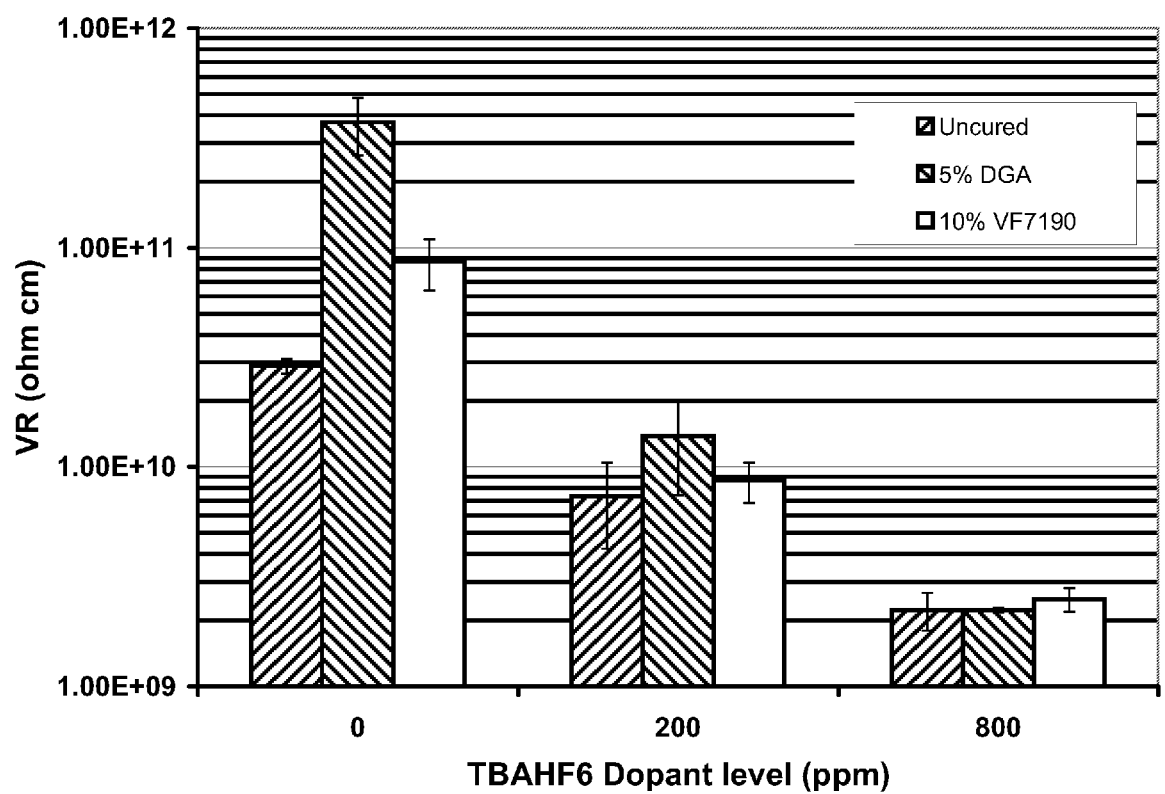
FIG. 3 is a graph showing the volume resistivities of non-cross-linked and cross-linked adhesive compositions containing various levels of dopant, as determined in the experiments reported in Example 4 below.
Figure 4:
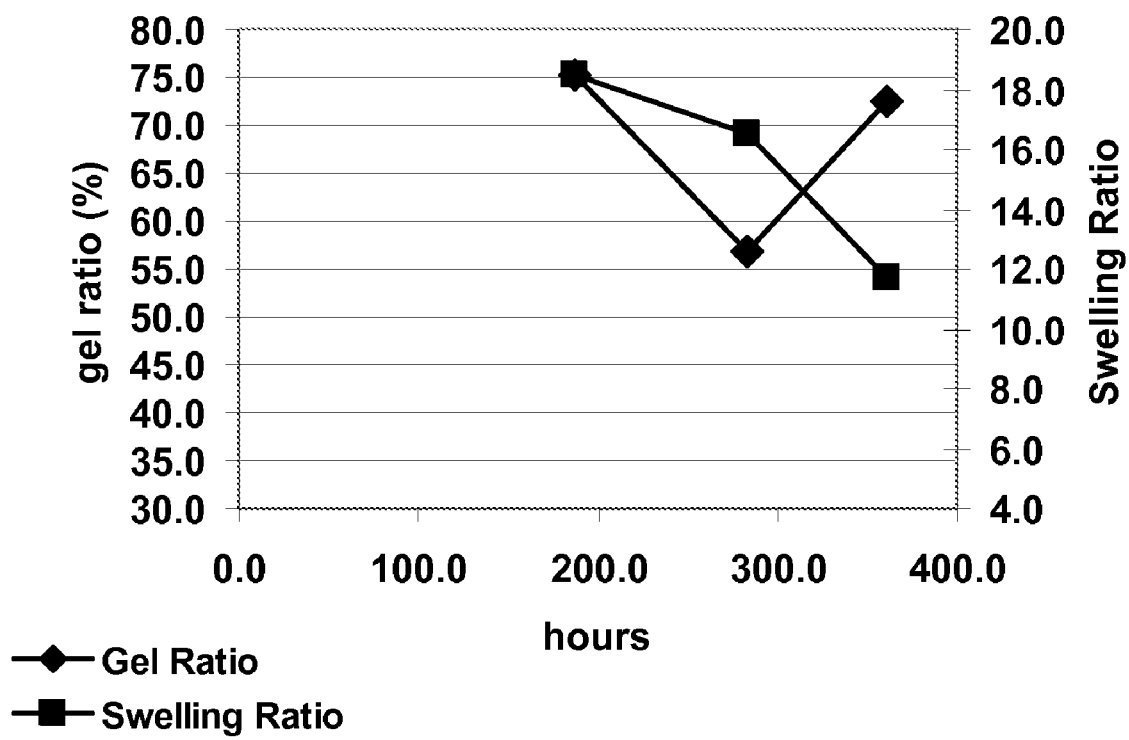
FIGS. 4-7 are graphs showing the change with curing time at varying temperatures of the gel content and swelling ratio of adhesive compositions of the present invention, as determined in the experiments reported in Example 5 below.
Figure 5:
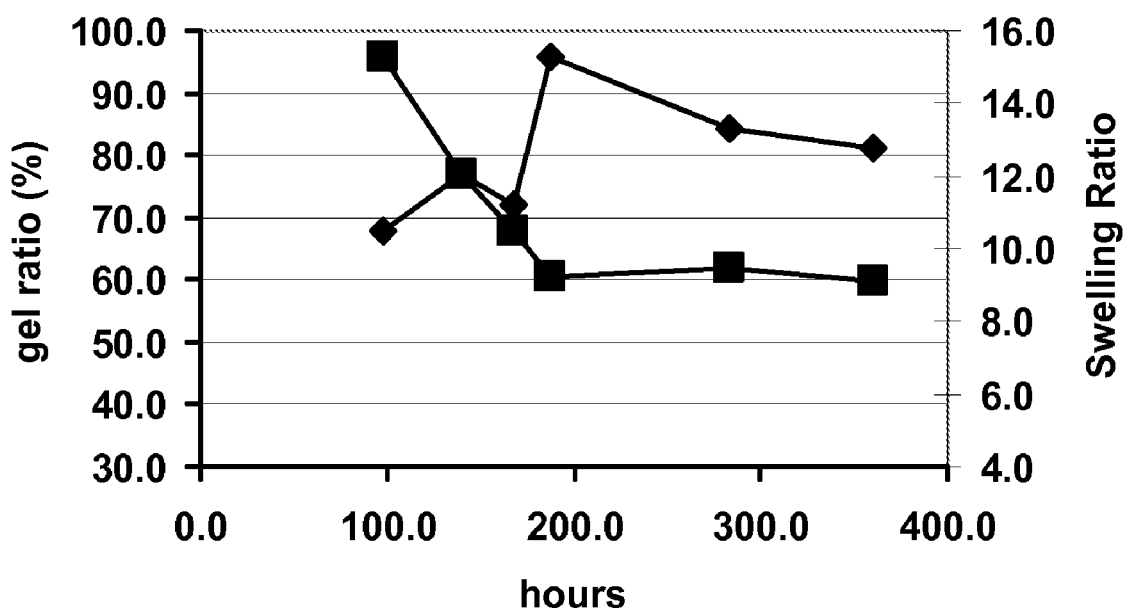
Figure 6:
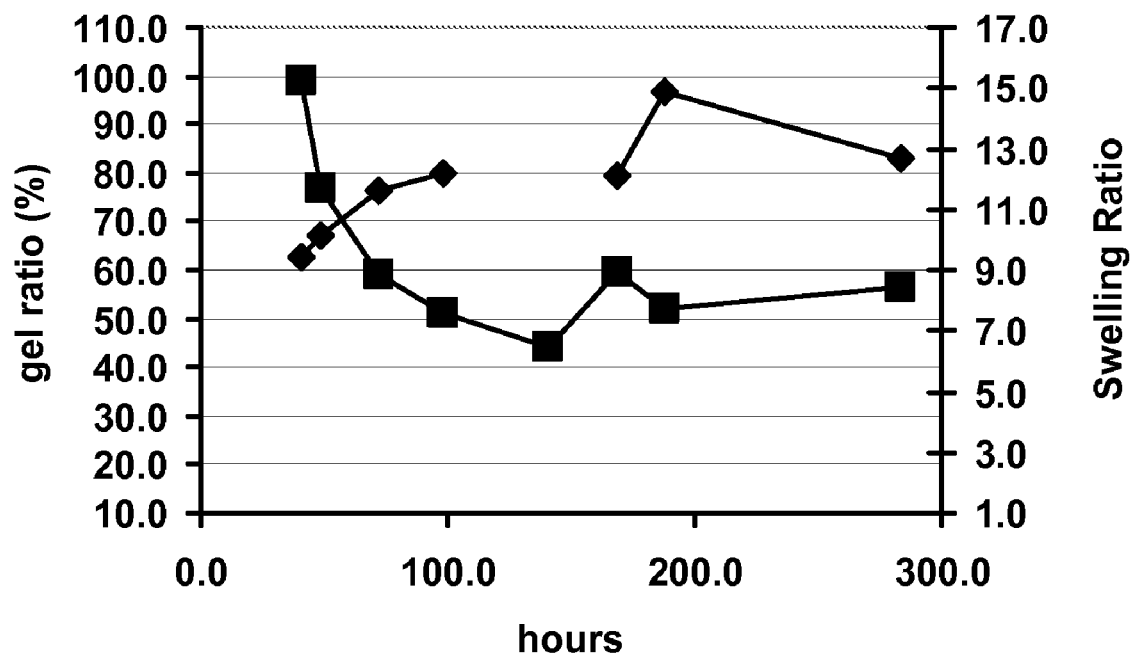
Figure 7:
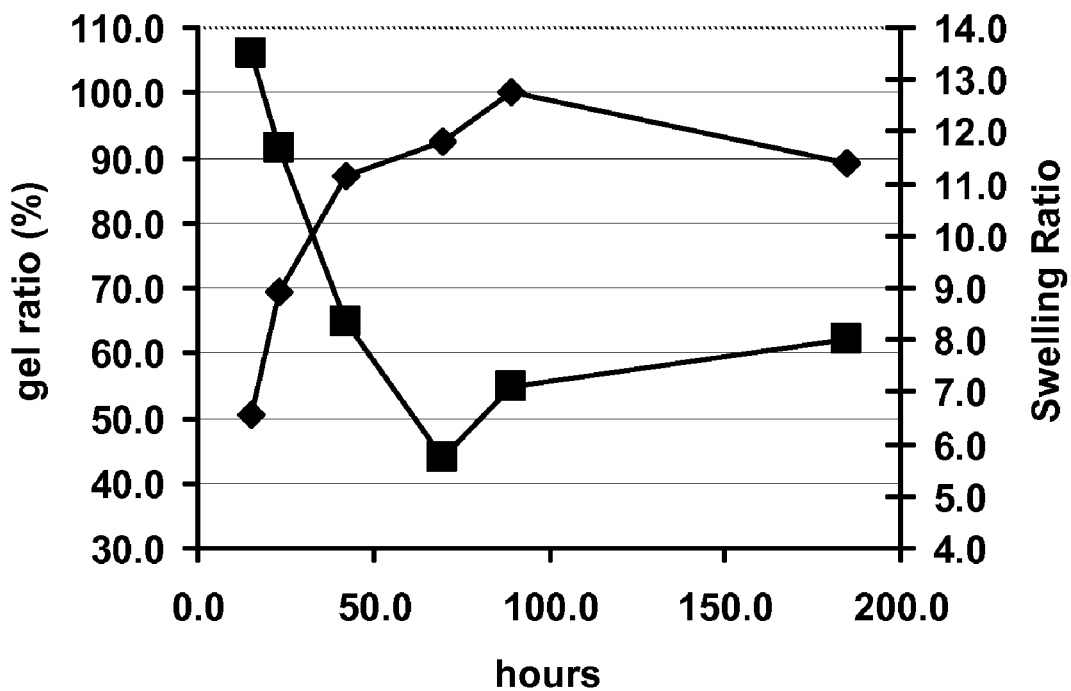

From FIG. 3 it will be seen that (as expected from previous work recorded in the aforementioned U.S. Pat. No. 7,173,752), cross-linking of the polyurethane significantly increased the volume resistivity of the adhesive composition in both the DGA and Vikoflex-containing compositions, although the increase in volume resistivity is noticeably smaller in the Vikoflex-containing composition; note that since the ordinate in FIG. 3 is on a logarithmic scale, the volume resistivity of the undoped Vikoflex-containing composition is only about one-third that of the DGA-containing composition. Furthermore, the increase in volume resistivity caused by cross-linking can be more than overcome by including a modest 200 ppm of the dopant in the compositions. For both the 200 and 800 ppm samples, there is little difference between the volume resistivities of the non-cross-linked and Vikoflex-containing compositions.

Example 5

Curing Time of Adhesive Compositions

It has been demonstrated above that the adhesive compositions of the present invention possess shelf lives greater than the prior art compositions in which the cross-linking agent is DGA. However, the need for increased shelf life must be balanced against the effect of the cross-linker on curing time (i.e., the time needed to drive the cross-linking reaction essentially to completion) since this curing time affects manufacturing throughput of any given plant. Accordingly, to investigate the effect of the epoxidized oil cross-linkers on curing time, adhesive compositions were prepared using the same polyurethane as in previous Examples and 5.7 percent by weight (on a solids basis) of Vikoflex 7190. The adhesive compositions were cast into films and the resultant films cured in ovens at 40, 50, 60 and 70° C. At various intervals, depending upon the curing temperature used, samples of the films were swollen in acetone as previously described and the swelling ratio and gel content were measured. Gel content is a measure of the amount of the polymer that has been incorporated into the swollen gel. It is measured by drying the swollen gel and taking the ratio of the dried gel mass to the starting mass of cast polymer. The curing time may be determined as the time at which the swelling ratio and gel content reach substantially constant values. The swelling ratio and gel content values measured for 40, 50, 60 and 70° C. curing temperatures are shown in FIGS. 4-7 respectively.

From FIGS. 4-7, it will be seen that the curing of the adhesive composition is strongly temperature dependent, with the cure time falling from more than 300 hours at 50° C. to 100-150 hours at 60° C. The latter value is significant, since a DGA-cross-linked composition requires about 100 hours to cure at 60° C. Thus, replacing DGA with Vikoflex 7190 in accordance with the present invention provides a several fold increase in shelf life (as demonstrated above) at the cost of only about a 50 percent increase in cure time.

The curing characteristics of the adhesive composition can be further examined by modeling the temperature dependent behavior. The data from FIGS. 4-7 can be used to calculate an activation energy according to an Arrhenius relationship for the reaction rate, which is proportional to $\exp(E_a/kT)$, where $E_a$ is the activation energy, k is Boltzmann's constant, and T is the absolute temperature. Typically the activation energy is specified as $E_a/k$ in ° K, and for the data show in the FIGS. 4-7 the activation energy is found to be approximately 5530° K. Using this value, the shelf life of the adhesive composition at various temperatures can be calculated, and the results are shown in Table 4 below; these calculated values agree well with the data shown previously.

TABLE 4

| Storage Temperature, ° C. | Time to gel, hours |
|---|---|
| 0 | 3757 |
| 5 | 2610 |
| 15 | 1309 |
| 25 | 688 |

Example 6

Increase in Achievable Modulus

Figure 8:
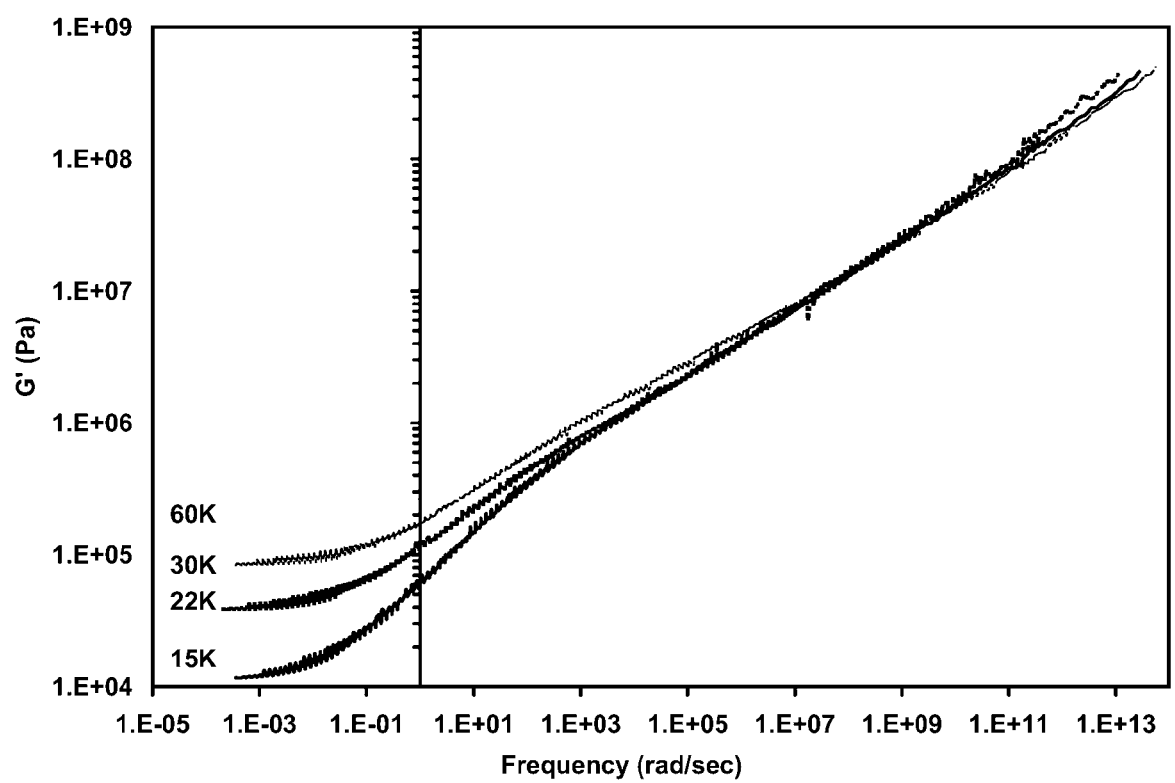
FIG. 8 is a graph similar to that of FIG. 2 and shows the variation of the elastic modulus of various adhesive compositions of the present invention with frequency, as determined in the experiments reported in Example 6 below.

The DMA tests of Example 3 above were repeated with adhesive compositions comprising the same polyurethane as in previous Examples, and either 20,000 ppm of DGA (as a control) or 15,000, 22,000, 30,000 or 60,000 ppm of Vikoflex 7190 as a cross-linker. All compositions were cured at 60° C. for 125 hours. The results are shown in FIG. 8.

Bearing in mind that the epoxy equivalent weight of Vikoflex 7190 is approximately 70 percent greater than that of DGA, it will be seen that the Vikoflex produces a substantially greater increase in the shear modulus of the adhesive composition than DGA per mole of epoxy groups introduced; 22,000 ppm of the Vikoflex produces essentially the same shear modulus as 20,000 ppm of DGA, although the Vikoflex introduces far fewer epoxy groups, while 30,000 ppm of the Vikoflex produces a substantially greater shear modulus than 20,000 ppm of DGA. Furthermore, the data in FIG. 8 show that the increase in shear modulus with increase in Vikoflex concentration continues up to about 60,000 ppm of Vikoflex, producing a shear modulus which is greater than can be achieved with DGA.

It is believed (although the invention is in no way limited by this belief) that the greater "efficiency" of the epoxy groups in the Vikoflex cross-linker in improving shear modulus arises from one or both of the following causes. Firstly, the epoxy equivalent weight of the Vikoflex cross-linker implies that it contains about 6 epoxy groups per molecule and can thus act as polyfunctional cross-linking agent, whereas DGA can only act as a difunctional cross-linking agent. It is well known to those skilled in polymer chemistry that polyfunctional cross-linking agents typically produce a stiffer cross-linked polymer than difunctional cross-linking agents. Secondly, in the Vikoflex cross-linker the epoxy groups occur in three long fatty acid chains, which are free to move independently of one another, so that the distance between epoxy groups can be much greater than in the relatively small and compact DGA molecule. Thus, after one epoxy group has reacted with the polyurethane (thus anchoring the cross-linker to a specific site on the polyurethane), there are far more potential reactive sites within "reach" of the Vikoflex cross-linker than the DGA molecule. This may affect the proportion of epoxy groups on the cross-linker which succeed in reacting with sites on the polyurethane, especially at high cross-linker concentrations.

Although the adhesive compositions of the present invention have primarily been described above with reference to their use in electro-optic displays, it will be appreciated that the compositions are not restricted to any particular use and may application in a variety of uses other than electro-optic displays. For example, the adhesive compositions may be used to laminate a variety of metal, glass and plastic substrates, which may have layers of inorganic, organic or metallized components within or on their surfaces. For instance, the adhesive compositions could be used to laminate printed circuit boards, where the ability of the non-cross-linked form of the adhesive composition may be useful in dealing with the irregular surfaces of such boards.

It will be apparent to those skilled in the art that numerous changes and modifications can be made in the specific embodiments of the present invention described above without departing from the scope of the invention. Accordingly, the whole of the foregoing description is to be construed in an illustrative and not in a limitative sense.

The invention claimed is:

1. An electro-optic display comprising:
   a layer of solid electro-optic material capable of changing at least one optical characteristic upon application of an electric field thereto;
   a backplane comprising at least one electrode arranged to apply an electric field to the layer of electro-optic material; and
   an adhesive layer disposed between the layer of electro-optic material and the backplane and adhesively securing the layer of electro-optic material to the backplane, the adhesive layer comprising a thermally-activated cross-linking agent capable, upon exposure to an activation temperature, of cross-linking the adhesive layer, the cross-linking agent comprising an epoxidized vegetable oil fatty acid or an epoxidized ester of such a fatty acid.

2. An electro-optic display according to claim 1 wherein the cross-linking agent is derived from a soybean or linseed oil.

3. An electro-optic display according to claim 1 wherein the cross-linking agent is a $C_{1-6}$ alkyl, $C_{2-6}$ alkenyl, epoxidized $C_{2-6}$ alkenyl, monoglycerol, diglycerol, $C_{4-6}$ polyol or glycol ester of a vegetable oil fatty acid, wherein the ester has at least one oxirane ring formed between two adjacent carbons in the carbon chain of the fatty acid.

4. An electro-optic display according to claim 1 wherein the cross-linking agent has an average of at least about three oxirane groups per molecule.

5. An electro-optic display according to claim 1 wherein the cross-linking agent is present in the adhesive layer in a concentration of at least about 5,000 parts per million by weight.

6. An electro-optic display according to claim 5 wherein the cross-linking agent is present in the adhesive layer in a concentration of at least about 10,000 parts per million by weight.

7. An electro-optic display according to claim 6 wherein the cross-linking agent is present in the adhesive layer in a concentration of from about 20,000 to about 40,000 parts per million by weight.

8. An electro-optic display according to claim 1 wherein the adhesive layer comprises a polyurethane.

9. An electro-optic display according to claim 8 wherein the adhesive layer comprises a polyurethane-polyurea polymer that is formed by reaction of at least one isocyanate with a polyol and a polyamine.

10. An electro-optic display according to claim 1 wherein the adhesive layer further comprises an agent effective to reduce the volume resistivity of the adhesive layer after cross-linking.

11. An electro-optic display according to claim 10 wherein the volume resistivity reducing agent comprises at least one of a salt, a polyelectrolyte or a hydroxyl containing polymer having a number average molecular weight not greater than about 5000.

12. An electro-optic display according to claim 11 wherein the volume resistivity reducing agent comprises a quaternary ammonium salt or a polyethylene glycol.

13. An electro-optic display according to claim 12 wherein the volume resistivity reducing agent comprises tetrabutylammonium chloride, tetrabutylammonium hexafluorophosphate or a polyethylene glycol having a number average molecular weight not greater than about 2000.

14. A process for producing an electro-optic display, the process comprising:
   providing an assembly comprising a layer of solid electro-optic material capable of changing at least one optical characteristic upon application of an electric field thereto; a backplane comprising at least one electrode arranged to apply an electric field to the layer of electro-optic material; and an adhesive layer disposed between the layer of electro-optic material and the backplane and adhesively securing the layer of electro-optic material to the backplane, the adhesive layer comprising a thermally-activated cross-linking agent capable of cross-linking the adhesive layer, the cross-linking agent comprising an epoxidized vegetable oil fatty acid or an epoxidized ester of such a fatty acid; and
   exposing the adhesive layer to a temperature sufficient to activate the cross-linking agent, thereby cross-linking the adhesive layer.

15. An electro-optic display comprising:
   a layer of solid electro-optic material capable of changing at least one optical characteristic upon application of an electric field thereto;
   a backplane comprising at least one electrode arranged to apply an electric field to the layer of electro-optic material; and
   an adhesive layer disposed between the layer of electro-optic material and the backplane and adhesively securing the layer of electro-optic material to the backplane, the adhesive layer having been cross-linked by a thermally-activated cross-linking agent comprising an epoxidized vegetable oil fatty acid or an epoxidized ester of such a fatty acid.

16. An article of manufacture comprising in order:
a light-transmissive electrically-conductive layer;
a layer of a solid electro-optic medium in electrical contact with the electrically-conductive layer;
an adhesive layer; and
a release sheet,
the adhesive layer comprising a thermally-activated cross-linking agent capable, upon exposure to an activation temperature, of cross-linking the adhesive layer, the cross-linking agent comprising an epoxidized vegetable oil fatty acid or an epoxidized ester of such a fatty acid.

17. An article of manufacture comprising:
a layer of a solid electro-optic medium having first and second surfaces on opposed sides thereof,
a first adhesive layer on the first surface of the layer of solid electro-optic medium;
a release sheet disposed on the opposed side of the first adhesive layer from the layer of solid electro-optic medium; and
a second adhesive layer on the second surface of the layer of solid electro-optic medium,
wherein at least one of the first and second adhesive layers comprises a thermally-activated cross-linking agent capable, upon exposure to an activation temperature, of cross-linking the adhesive layer in which it is present, the cross-linking agent comprising an epoxidized vegetable oil fatty acid or an epoxidized ester of such a fatty acid.

18. An article of manufacture comprising, in order:
a release sheet;
a layer of a solid electro-optic medium;
an adhesive layer; and
at least one of a light-transmissive protective layer and a light-transmissive electrically-conductive layer,
the adhesive layer comprising a thermally-activated cross-linking agent capable, upon exposure to an activation temperature, of cross-linking the adhesive layer, the cross-linking agent comprising an epoxidized vegetable oil fatty acid or an epoxidized ester of such a fatty acid.

19. An adhesive composition comprising a polyurethane and a thermal cross-linking agent capable, upon exposure to an activation temperature, of cross-linking the polyurethane, the cross-linking agent comprising an epoxidized vegetable oil fatty acid or an epoxidized ester of such a fatty acid.

20. An adhesive composition according to claim 19 wherein the cross-linking agent is derived from a soybean or linseed oil.

21. An adhesive composition according to claim 19 wherein the cross-linking agent is a $C_{1-6}$ alkyl, $C_{2-6}$ alkenyl, epoxidized $C_{2-6}$ alkenyl, monoglycerol, diglycerol, $C_{4-6}$ polyol or glycol ester of a vegetable oil fatty acid, wherein the ester has at least one oxirane ring formed between two adjacent carbons in the carbon chain of the fatty acid.

22. An adhesive composition according to claim 19 wherein the cross-linking agent has an average of at least about three oxirane groups per molecule.

23. An adhesive composition according to claim 19 wherein the cross-linking agent is present in a concentration of at least about 5,000 parts per million by weight.

24. An adhesive composition according to claim 23 wherein the cross-linking agent is present in a concentration of at least about 10,000 parts per million by weight.

25. An adhesive composition according to claim 24 wherein the cross-linking agent is present in a concentration of from about 20,000 to about 40,000 parts per million by weight.

26. A laminate structure comprising first and second layers of solid glass, metal or plastic, and an adhesive layer disposed between the first and second layers and securing the first and second layers to each other, wherein the adhesive layer comprises the adhesive layer comprising a thermally-activated cross-linking agent capable, upon exposure to an activation temperature, of cross-linking the adhesive layer, the cross-linking agent comprising an epoxidized vegetable oil fatty acid or an epoxidized ester of such a fatty acid.

27. A laminate structure according to claim 26 wherein at least one of the first and second layers has at least one layer of an inorganic, organic or metallized components within or on its surface.

28. A laminate structure according to claim 26 in the form of a printed circuit board.

29. A laminate structure according to claim 26 wherein the cross-linking agent has an average of at least about three oxirane groups per molecule.

30. A laminate structure according to claim 26 wherein the adhesive layer comprises a polyurethane.

31. A laminate structure according to claim 26 wherein the adhesive layer further comprises an agent effective to reduce the volume resistivity of the adhesive layer after cross-linking.

* * * * *